US012754364B2

(12) United States Patent
Lin et al.

(10) Patent No.: US 12,754,364 B2
(45) Date of Patent: Oct. 6, 2026

(54) TECHNOLOGIES FOR OPTICAL DEMULTIPLEXING WITH BACKWARDS COMPATIBILITY

(71) Applicant: Intel Corporation, Santa Clara, CA (US)

(72) Inventors: Wenhua Lin, Fremont, CA (US); Saeed Fathololoumi, Los Gatos, CA (US); Pegah Seddighian, San Jose, CA (US); Tiehui Su, San Jose, CA (US); David Chak Wang Hui, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 58 days.

(21) Appl. No.: 18/146,332

(22) Filed: Dec. 23, 2022

(65) Prior Publication Data

US 2023/0125660 A1 Apr. 27, 2023

Related U.S. Application Data

(60) Provisional application No. 63/416,912, filed on Oct. 17, 2022.

(51) Int. Cl.
*G02B 6/12* (2006.01)
*G02B 6/293* (2006.01)
(Continued)

(52) U.S. Cl.
CPC ..... *G02B 6/12007* (2013.01); *G02B 6/12016* (2013.01); *G02B 6/12019* (2013.01);
(Continued)

(58) Field of Classification Search
CPC ........... G02B 6/12007; G02B 6/12016; G02B 6/12019; G02B 6/12021; G02B 6/29326;
(Continued)

(56) References Cited

U.S. PATENT DOCUMENTS 6,724,957 B2 * 4/2004 Saida ................ G02B 6/29355
385/27
6,735,358 B2 * 5/2004 Kitoh ................. H04J 14/0307
398/43
(Continued)

OTHER PUBLICATIONS

B. Akca and C. R. Doerr, "Interleaved Silicon Nitride AWG Spectrometers" IEEE PTL, vol. 31, No. 1, Jan. 1, 2019.
(Continued)

*Primary Examiner* — Ryan A Lepisto
(74) *Attorney, Agent, or Firm* — Alliance IP, LLC

(57) ABSTRACT

In one embodiment, a silicon photonic integrated circuit (PIC) includes a pair of Mach-Zehnder Interferometers (MZI) with a phase shifter to function as a 1×2 optical switches. On one path between the MZIs is a wavelength interleaver. The MZI switch can be controlled to either an all-pass mode or a by-pass mode, therefore setting configurable optical demultiplexing bandwidths to support dual 1.6T FR8/800G FR4 network backward compatibility. The configurable multiplexer operates at set-and-forget mode for the entire operating temperature and the product's lifetime.

25 Claims, 18 Drawing Sheets

(51) Int. Cl.
*H04J 14/02* (2006.01)
*G02B 6/35* (2006.01)

(52) U.S. Cl.
CPC ..... *G02B 6/29326* (2013.01); *G02B 6/29386* (2013.01); *H04J 14/0307* (2023.08); *G02B 6/12021* (2013.01); *G02B 2006/12061* (2013.01); *G02B 2006/12107* (2013.01); *G02B 2006/12164* (2013.01); *G02B 6/29355* (2013.01); *G02B 6/356* (2013.01)

(58) Field of Classification Search
CPC ....................... G02B 6/29355; G02B 6/29386; G02B 6/356; G02B 2006/12061; G02B 2006/12107; G02B 2006/12164; H04J 14/0307
See application file for complete search history.

(56) References Cited

U.S. PATENT DOCUMENTS

| | | | | |
|---|---|---|---|---|
| 7,085,438 | B2 * | 8/2006 | Mizuno | G02B 6/12023 398/43 |
| 7,171,067 | B2 * | 1/2007 | Doerr | H04J 14/0213 385/14 |
| 8,224,139 | B2 * | 7/2012 | Little | G02B 6/12007 359/337.11 |
| 8,483,525 | B2 * | 7/2013 | Kitoh | G02B 6/12019 385/14 |
| 8,625,943 | B2 * | 1/2014 | Soma | G02B 6/12019 385/38 |
| 8,737,779 | B2 * | 5/2014 | Kitoh | G02B 6/12021 385/37 |
| 8,879,873 | B2 * | 11/2014 | Goh | H04B 10/5053 385/3 |
| 9,020,307 | B2 * | 4/2015 | Ishikawa | G02B 6/243 385/38 |
| 10,050,717 | B2 * | 8/2018 | Goh | G02B 6/29355 |
| 11,585,899 | B2 * | 2/2023 | Nicolaescu | G01S 17/89 |
| 11,656,405 | B2 * | 5/2023 | Oguma | G02B 6/12019 385/37 |
| 12,111,210 | B2 * | 10/2024 | Arbore | G01J 3/32 |
| 2005/0276539 | A1 * | 12/2005 | Fukuda | G02B 6/29353 385/24 |
| 2021/0302652 | A1 * | 9/2021 | Vulovic | G02B 6/12016 |

OTHER PUBLICATIONS

D. Dai, L. Liu, L. Wosinski, and S. He, “Design and fabrication of ultra-small overlapped AWG demultiplexer based on α-Si nanowire waveguides,” Electron. Lett., vol. 42, No. 7, pp. 400-402, Mar. 2006.

Folkert Horst, William M.J. Green, Solomon Assefa, Steven M. Shank, Yurii A. Vlasov, and Bert Jan Offrein, “Cascaded Mach-Zehnder wavelength filters in silicon photonics for low loss and flat pass-band WDM (de-) multiplexing”, May 2013, 7 pages.

J. Brouckaert, W. Bogaerts, p. Dumon, D. V. Thourhout, and R. Baets, “Planar Concave Grating Demultiplexer Fabricated on a Nanophotonic Silicon-on-Insulator Platform,” J. Light. Technol., vol. 25, No. 5, pp. 1269-1275, May 2007.

Smit, Phasar-based WDM-devices—Principles, design and applications, Jun. 1996, [IEEE JSTQE 2 (1996) p. 236-250].

* cited by examiner

TECHNOLOGIES FOR OPTICAL DEMULTIPLEXING WITH BACKWARDS COMPATIBILITY

CROSS-REFERENCE TO RELATED APPLICATIONS

This application claims the benefit of U.S. provisional patent application No. 63/416,912, filed Oct. 17, 2022, and entitled "TECHNOLOGIES FOR OPTICAL DEMULTIPLEXING WITH BACKWARDS COMPATIBILITY." The disclosure of the prior application is considered part of and is hereby incorporated by reference in its entirety in the disclosure of this application.

BACKGROUND

As datacenter transmission equipment pushes towards higher baud rates and spectral efficiencies, equipment such as routers, network interface controllers, etc., will require upgrading. Some common network architectures employ various generations of coarse wavelength-division-multiplexed (CWDM) deployment, with four channels spaced apart by 20 nanometers on a single fiber. Future improvements may increase the channel density, such as channels spaced apart by 10 nanometers on a single fiber.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
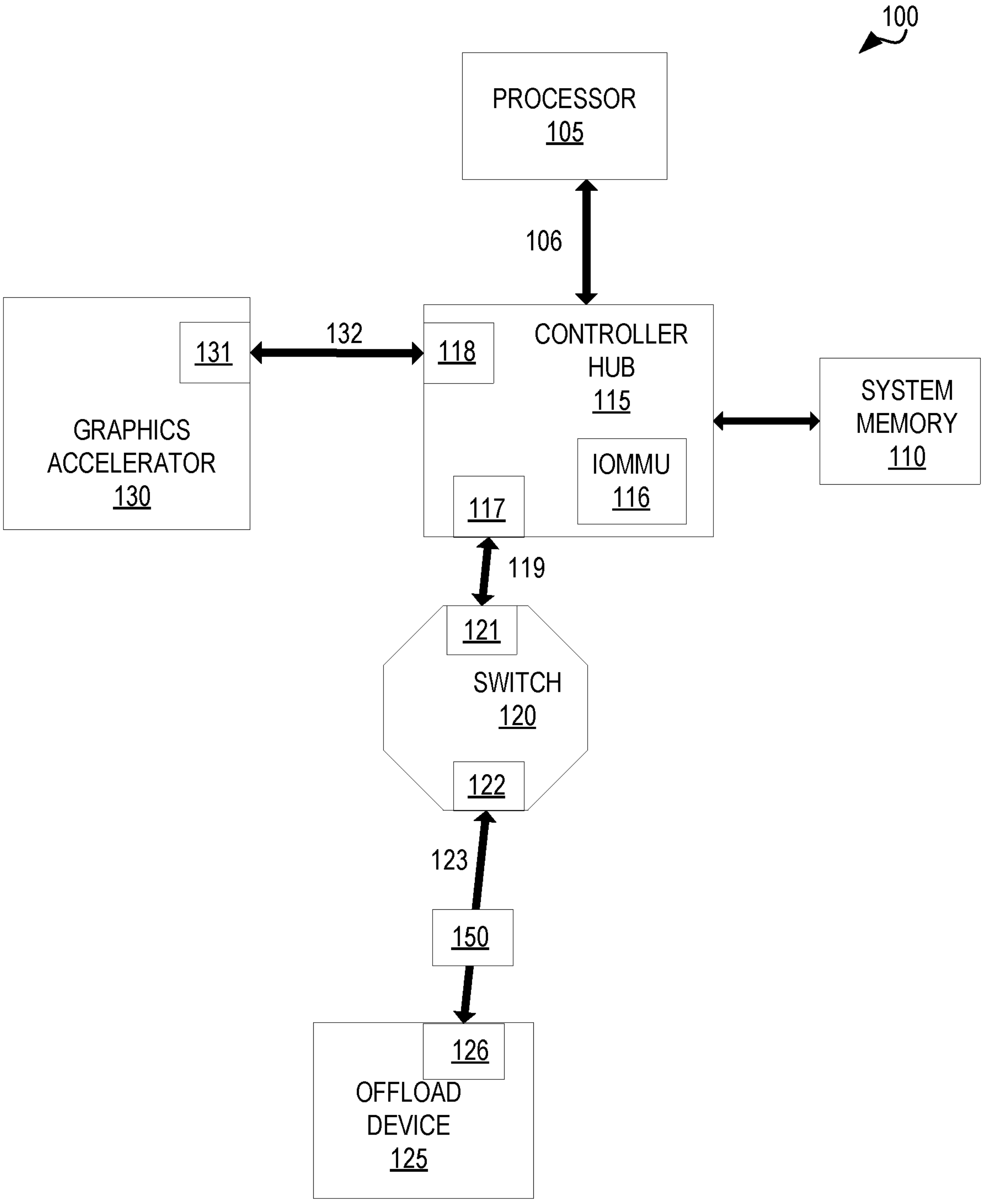
FIG. 1 illustrates an embodiment of a computing system including an interconnect architecture.

High-bandwidth computing applications, such as artificial intelligence and machine learning, require data center interconnects with increased bandwidth. Bandwidth may be increased by, e.g., increasing the number of wavelength channels in a single fiber while reducing wavelength channel spacing. For example, one network architecture employs coarse wavelength division multiplexing (CWDM) with four wavelengths separated by 20 nanometers, which may be referred to as FR4. Each of the four channels transmits at a rate of 100 gigabits per second (Gbps) using 4-level pulse amplitude modulation (PAM4), giving a total bandwidth of 400 Gbps. One approach to increasing total bandwidth is to increase the per-channel transmission rate to 200 Gbps as well as increasing from four to eight wavelengths with a denser wavelength channel spacing of 10 nanometers, which may be referred to as FR8. Such an approach would allow total bandwidth of 1.6 terabits per second (Tbps) while minimizing the four-wave-mixing fiber impairment at higher 200 GB/s PAM4 rate.

A 1.6 Tbps FR8 link may use a narrow wavelength range (e.g., 6-7 nm) to accommodate 10 nm channel spacing in the transmit-receive link, while the traditional FR4 link supports a wide wavelength range (e.g., 13 nm) in the transmit-receive link with 20 nm channel spacing. However, the channels for the less-dense four-channel configuration may overlap with more than one channel in the denser eight-channel configuration. As a result, fixed wavelength division multiplexers designed for denser channel spacing may not be compatible with less dense channel spacing. Such incompatibilities may increase cost and/or complexity when upgrading a data center or maintaining a data center in a mixed environment.

In order to address such compatibility issues, a reconfigurable wavelength division multiplexer can be used. As described in more detail below, a wavelength division multiplexer may be able to be configured between one configuration in which it is compatible with one channel spacing and a second configuration in which it is compatible with another configuration.

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages, and operation, etc. in order to provide a thorough understanding of the present disclosure. It will be apparent, however, to one skilled in the art that these specific details need not be employed to practice embodiments of the present disclosure. In other instances, well-known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of a computer system haven't been described in detail in order to avoid unnecessarily obscuring embodiments of the present disclosure.

Although the following embodiments may be described with reference to energy conservation and energy efficiency in specific integrated circuits, such as in computing platforms or microprocessors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to desktop computer systems or Ultrabooks™ and may also be used in other devices, such as handheld devices, tablets, other thin notebooks, systems on a chip (SOC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. Moreover, the apparatus', methods, and systems described herein are not limited to physical computing devices but may also relate to software optimizations for energy conservation and efficiency. As will become readily apparent in the description below, the embodiments of methods, apparatus', and systems described herein (whether in reference to hardware, firmware, software, or a combination thereof) are vital to a 'green technology' future balanced with performance considerations.

As computing systems are advancing, the components therein are becoming more complex. As a result, the interconnect architecture to couple and communicate between the components is also increasing in complexity to ensure bandwidth requirements are met for optimal component operation. Furthermore, different market segments demand different aspects of interconnect architectures to suit the market's needs. For example, servers require higher performance, while the mobile ecosystem is sometimes able to sacrifice overall performance for power savings. Yet, it's a singular purpose of most fabrics to provide highest possible performance with maximum power saving. Below, a number of interconnects are discussed, which would potentially benefit from aspects of the present disclosure.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring to FIG. 1, an embodiment of a fabric composed of point-to-point Links that interconnect a set of components is illustrated. System 100 includes processor 105, controller hub 115, and system memory 110 coupled to controller hub 115. Processor 105 includes any processing element, such as a microprocessor, a host processor, an embedded processor, a co-processor, or other processor. Processor 105 is coupled to controller hub 115 through front-side buses (FSB) 106, respectively. It should be appreciated that, in some embodiments, the computing system 100 may include more or fewer processors. In computing systems 100 with more processors, each pair of processors may be connected by a link 109. In one embodiment, FSB 106 is a serial point-to-point interconnect as described below. In another embodiment, link 106 includes a serial, differential interconnect architecture that is compliant with different interconnect standard, such as a Quick Path Interconnect (QPI) or an Ultra Path Interconnect (UPI). In some implementations, the system may include logic to implement multiple protocol stacks and further logic to negotiation alternate protocols to be run on top of a common physical layer, among other example features.

System memory 110 includes any memory device, such as random access memory (RAM), non-volatile (NV) memory, or other memory accessible by devices in system 100. In the illustrative embodiment, the system memory 110 is coupled to the controller hub 115. Additionally or alternatively, in some embodiments, the system memory 110 is coupled to processor 105 though a memory interface. Examples of a memory interface include a double-data rate (DDR) memory interface, a dual-channel DDR memory interface, and a dynamic RAM (DRAM) memory interface.

In one embodiment, controller hub 115 is a root hub, root complex, or root controller in a Peripheral Component Interconnect Express (PCIe or PCIE) interconnection hierarchy. Examples of controller hub 115 include a chipset, a memory controller hub (MCH), a northbridge, an interconnect controller hub (ICH) a southbridge, and a root controller/hub. Often the term chipset refers to two physically separate controller hubs, i.e. a memory controller hub (MCH) coupled to an interconnect controller hub (ICH). Note that current systems often include the MCH integrated with processors 105, while controller 115 is to communicate with I/O devices, in a similar manner as described below. In some embodiments, peer-to-peer routing is optionally supported through root complex 115.

The controller hub 115 also includes an input/output memory management unit (IOMMU) 116. In some embodiments, the IOMMU 116 may be referred to as a translation agent. In the illustrative embodiment, the IOMMU 116 forms part of the controller hub 115. Additionally or alternatively, in some embodiments, some or all of the IOMMU 116 may be a separate component from the controller hub 115. The IOMMU 116 can include hardware circuitry, software, or a combination of hardware and software. The IOMMU 116 can be used to provide address translation services (ATS) for address spaces in the memory 110 to allow one or more of the offload devices 125 to perform memory transactions to satisfy job requests issued by the host system.

Here, controller hub 115 is coupled to switch/bridge 120 through serial link 119. Input/output modules 117 and 121, which may also be referred to as interfaces/ports 117 and 121, include/implement a layered protocol stack to provide communication between controller hub 115 and switch 120. In one embodiment, multiple devices are capable of being coupled to switch 120. In some embodiments, the port 117 may be referred to as a root port 117.

Switch/bridge 120 routes packets/messages from offload device 125 upstream, i.e., up a hierarchy towards a root complex, to controller hub 115 and downstream, i.e., down a hierarchy away from a root controller, from processor 105 or system memory 110 to offload device 125. Switch 120, in one embodiment, is referred to as a logical assembly of multiple virtual PCI-to-PCI bridge devices. Offload device 125 includes any internal or external device or component to be coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a Firewire device, a Universal Serial Bus (USB) device, a scanner, an accelerator device, a field programmable gate array (FPGA), an application specific integrated circuit, and other input/output devices. Often in the PCIe vernacular, such as device, is referred to as an endpoint. Although not specifically shown, offload device 125 may include a PCIe to PCI/PCI-X bridge to support legacy or other version PCI devices. Endpoint devices in PCIe are often classified as legacy, PCIe, or root complex integrated endpoints.

Graphics accelerator 130 is also coupled to controller hub 115 through serial link 132. In one embodiment, graphics accelerator 130 is coupled to an MCH, which is coupled to an ICH. Switch 120, and accordingly offload device 125, is then coupled to the ICH. I/O modules 131 and 118 are also to implement a layered protocol stack to communicate between graphics accelerator 130 and controller hub 115. Similar to the MCH discussion above, a graphics controller or the graphics accelerator 130 itself may be integrated in processor 105. Further, one or more links (e.g., 123) of the system can include one or more extension devices (e.g., 150), such as retimers, repeaters, etc.

Figure 2:
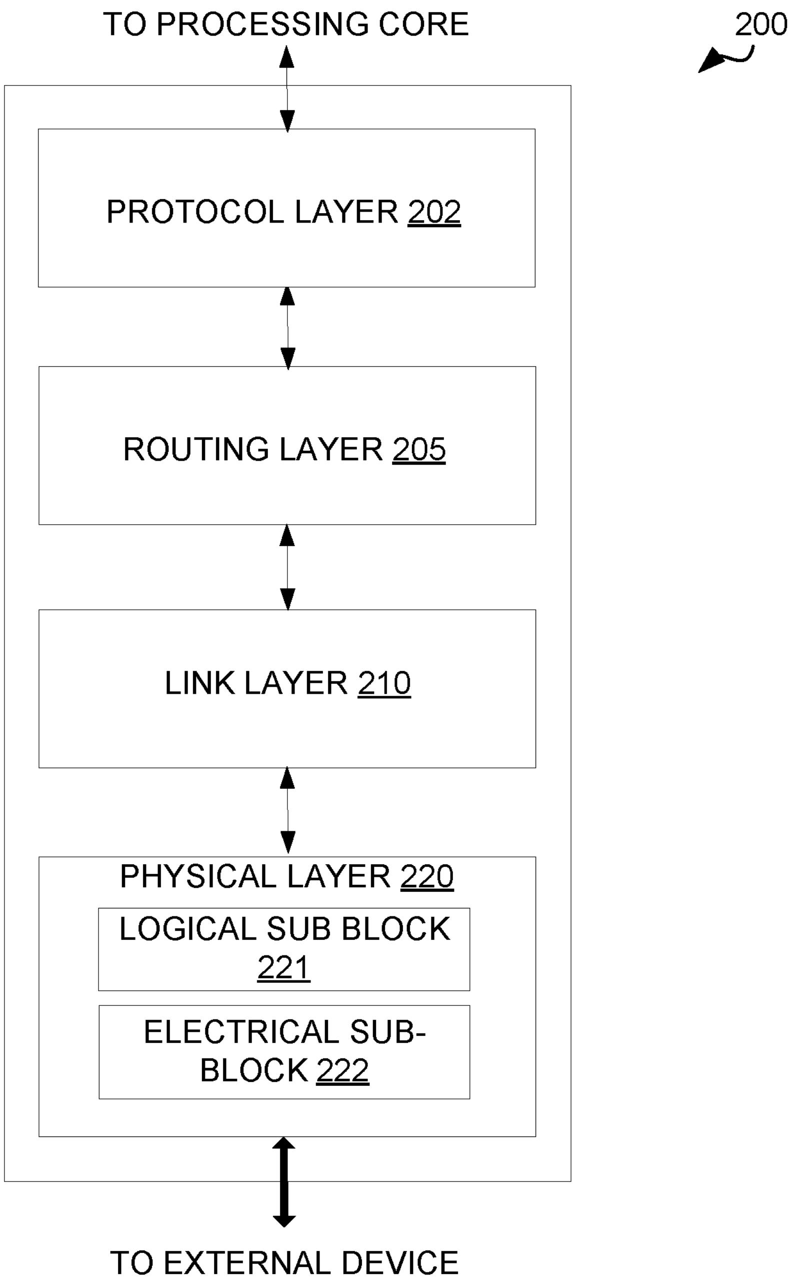
FIG. 2 illustrates an embodiment of an interconnect architecture including a layered stack.
Figure 3:
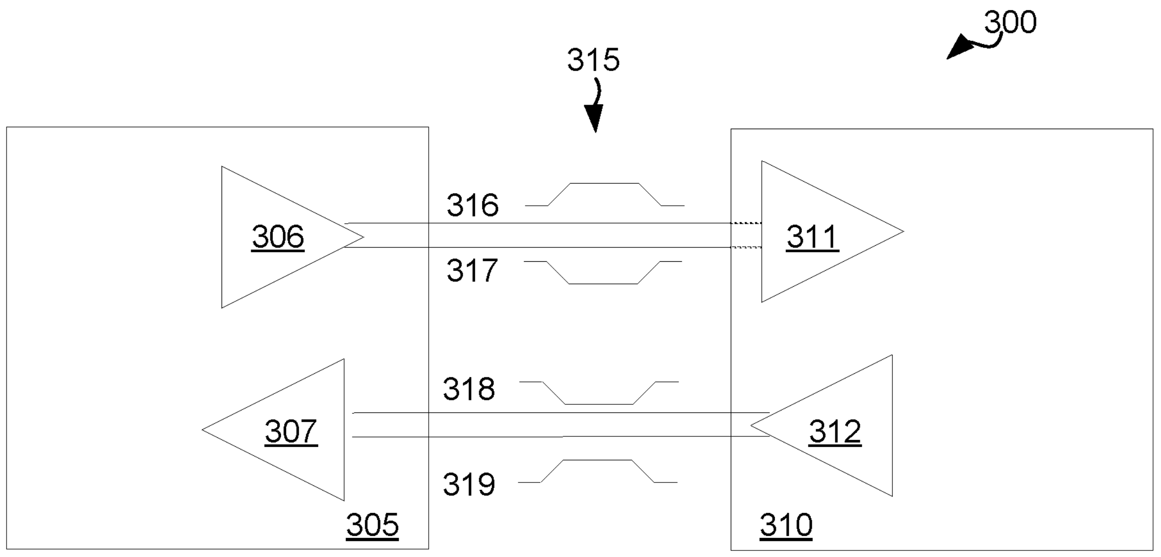
FIG. 3 illustrates an embodiment of a transmitter and receiver pair for an interconnect architecture.

Turning to FIG. 2 an embodiment of a layered protocol stack is illustrated. Layered protocol stack 200 includes any form of a layered communication stack, such as a Quick Path Interconnect (QPI) stack, an Ultra Path Interconnect (UPI) stack, a PCIe stack, a Compute Express Link (CXL), a next generation high performance computing interconnect stack, or other layered stack. Although the discussion immediately below in reference to FIGS. 1-3 are in relation to a UPI stack, the same concepts may be applied to other interconnect stacks. In one embodiment, protocol stack 200 is a UPI protocol stack including protocol layer 202, routing layer 205, link layer 210, and physical layer 220. An interface or link, such as link 109 in FIG. 1, may be represented as communication protocol stack 200. Representation as a communication protocol stack may also be referred to as a module or interface implementing/including a protocol stack.

UPI uses packets to communicate information between components. Packets are formed in the Protocol Layer 202 to carry the information from the transmitting component to the receiving component. As the transmitted packets flow through the other layers, they are extended with additional information necessary to handle packets at those layers. At the receiving side the reverse process occurs and packets get transformed from their Physical Layer 220 representation to the Data Link Layer 210 representation and finally to the form that can be processed by the Protocol Layer 202 of the receiving device.

Protocol Layer

In one embodiment, protocol layer 202 is to provide an interface between a device's processing core and the interconnect architecture, such as data link layer 210 and physical layer 220. In this regard, a primary responsibility of the protocol layer 202 is the assembly and disassembly of packets. The packets may be categorized into different classes, such as home, snoop, data response, non-data response, non-coherent standard, and non-coherent bypass.

Routing Layer

The routing layer 205 may be used to determine the course that a packet will traverse across the available system interconnects. Routing tables may be defined by firmware and describe the possible paths that a packet can follow. In small configurations, such as a two-socket platform, the routing options are limited and the routing tables quite simple. For larger systems, the routing table options may be more complex, giving the flexibility of routing and rerouting traffic.

Link Layer

Link layer 210, also referred to as data link layer 210, acts as an intermediate stage between protocol layer 202 and the physical layer 220. In one embodiment, a responsibility of the data link layer 210 is providing a reliable mechanism for exchanging packets between two components. One side of the data link layer 210 accepts packets assembled by the protocol layer 202, applies an error detection code, i.e., CRC, and submits the modified packets to the physical layer 220 for transmission across a physical to an external device. In receiving packets, the data link layer 210 checks the CRC and, if an error is detected, instructs the transmitting device to resend. In the illustrative embodiment, CRC are performed at the flow control unit (flit) level rather than the packet level. In the illustrative embodiment, each flit is 80 bits. In other embodiments, each flit may be any suitable length, such as 16, 20, 32, 40, 64, 80, or 128 bits.

Physical Layer

In one embodiment, physical layer 220 includes logical sub block 221 and electrical sub-block 222 to physically transmit a packet to an external device. Here, logical sub-block 221 is responsible for the "digital" functions of Physical Layer 220. In this regard, the logical sub-block includes a transmit section to prepare outgoing information for transmission by physical sub-block 222, and a receiver section to identify and prepare received information before passing it to the Link Layer 210.

Physical block 222 includes a transmitter and a receiver. The transmitter is supplied by logical sub-block 221 with symbols, which the transmitter serializes and transmits onto to an external device. The receiver is supplied with serialized symbols from an external device and transforms the received signals into a bit-stream. The bit-stream is de-serialized and supplied to logical sub-block 221. In the illustrative embodiment, the physical layer 220 sends and receives bits in groups of 20 bits, called a physical unit or phit. In some embodiments, a line coding, such as an 8b/10b transmission code or a 64b/66b transmission code, is employed. In some embodiments, special symbols are used to frame a packet with frames 223. In addition, in one example, the receiver also provides a symbol clock recovered from the incoming serial stream.

As stated above, although protocol layer 202, routing layer 205, link layer 210, and physical layer 220 are discussed in reference to a specific embodiment of a QPI protocol stack, a layered protocol stack is not so limited. In fact, any layered protocol may be included/implemented. As an example, a port/interface that is represented as a layered protocol includes: (1) a first layer to assemble packets, i.e. a protocol layer; a second layer to sequence packets, i.e. a link layer; and a third layer to transmit the packets, i.e. a physical layer. As a specific example, a common standard interface (CSI) layered protocol is utilized.

Referring next to FIG. 3, an embodiment of a UPI serial point-to-point link is illustrated. Although an embodiment of a UPI serial point-to-point link is illustrated, a serial point-to-point link is not so limited, as it includes any transmission path for transmitting serial data. In the embodiment shown, a basic UPI serial point-to-point link includes two, low-voltage, differentially driven signal pairs: a transmit pair 306/312 and a receive pair 311/307. Accordingly, device 305 includes transmission logic 306 to transmit data to device 310 and receiving logic 307 to receive data from device 310. In other words, two transmitting paths, i.e. paths 316 and 317, and two receiving paths, i.e. paths 318 and 319, are included in a UPI link.

A transmission path refers to any path for transmitting data, such as a transmission line, a copper line, an optical line, a wireless communication channel, an infrared communication link, or other communication path. A connection between two devices, such as device 305 and device 310, is referred to as a link, such as link 315. A link may support one lane—each lane representing a set of differential signal pairs (one pair for transmission, one pair for reception). To scale bandwidth, a link may aggregate multiple lanes denoted by xN, where N is any supported Link width, such as 1, 2, 4, 5, 8, 10, 12, 16, 20, 32, 64, or wider. In some implementations, each symmetric lane contains one transmit differential pair and one receive differential pair. Asymmetric lanes can contain unequal ratios of transmit and receive pairs. Some technologies can utilize symmetric lanes (e.g., UPI), while others (e.g., Displayport) may not and may even including only transmit or only receive pairs, among other examples. A link may refer to a one-way link (such as the link established by transmission logic 306 and receive logic 311) or may refer to a bi-directional link (such as the links established by transmission logic 306 and 312 and receive logic 307 and 311).

A differential pair refers to two transmission paths, such as lines 316 and 317, to transmit differential signals. As an example, when line 316 toggles from a low voltage level to a high voltage level, i.e. a rising edge, line 317 drives from a high logic level to a low logic level, i.e. a falling edge. Differential signals potentially demonstrate better electrical characteristics, such as better signal integrity, i.e. cross-coupling, voltage overshoot/undershoot, ringing, etc. This allows for better timing window, which enables faster transmission frequencies.

Figure 4:
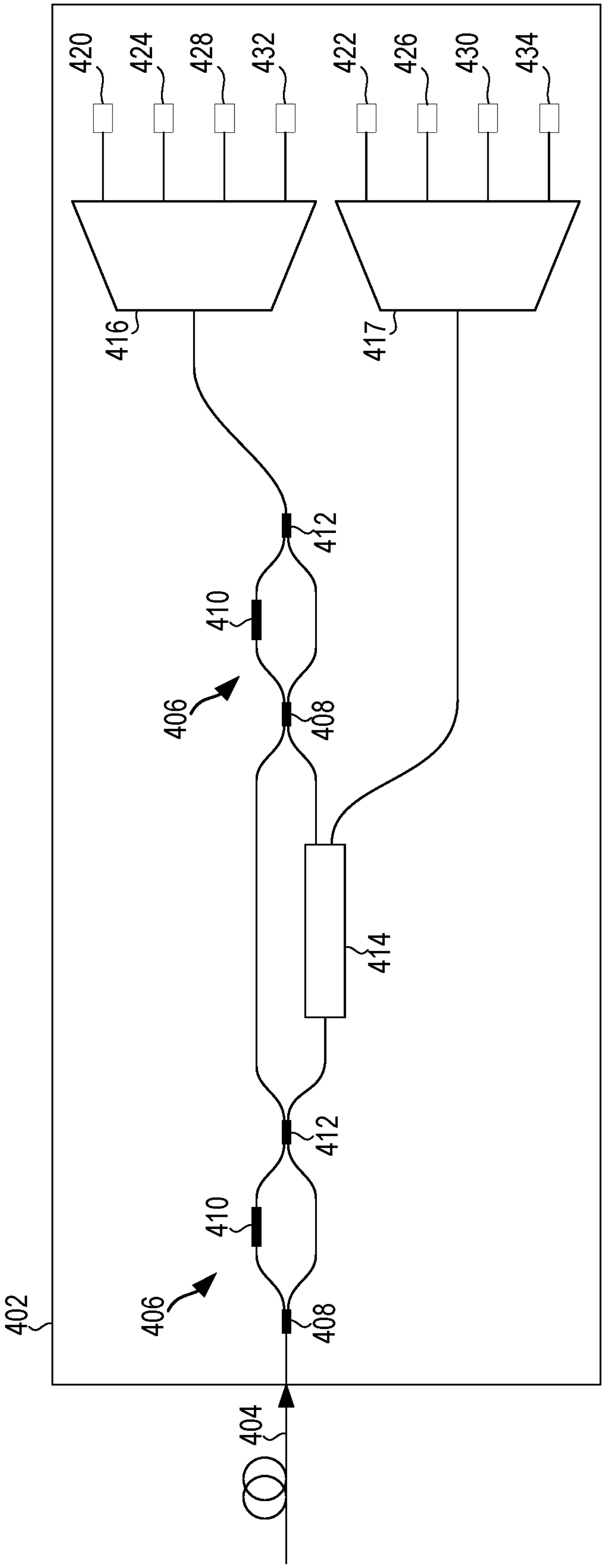
FIG. 4 is a simplified block diagram showing a photonic integrated circuit (PIC) die with configurable wavelength division multiplexing.

Referring now to FIG. 4, in one embodiment, a silicon photonic integrated circuit (PIC) die 402 can include a reconfigurable wavelength division multiplexer. An optical fiber 404 may be connected to the PIC die 402. Waveguides defined in the PIC die 402 channel light between various components on the PIC die 402. The PIC die 402 includes a pair of Mach-Zehnder Interferometers (MZI) 406 with a phase shifter 410 to function as a 1×2 optical switch. The MZIs 406 can act as cross/bar switches. In the "bar" state, when the phase of the phase shifter 410 is equal to R, light entering the upper port will leave the upper port. In the "cross" state, when the phase of the phase shifter 410 is equal to zero, light entering the upper port will leave the lower port. It should be appreciated that "upper" and "lower" are merely used in reference to the orientation shown in one illustrative embodiment shown in FIG. 4, and the use of those terms does not imply any particular orientation of the PIC die 402 or components of the PIC die 402 during manufacture or use. The state of the MZIs 406 and, generally, the state of the PIC die 402 can be set in any suitable manner, such as by using software, firmware, or hardware of the computing system 100. In some embodiments, the state of the MZIs 406 and/or the state of the PIC die 402 can be controlled using, e.g., switches connected to the PIC die 402.

One path between the MZIs 406 has a wavelength interleaver 414. One output of the interleaver 414 continues to one of the inputs to the second MZI 406. The other output of the interleaver 414 is connected to a demultiplexer 417 with relatively low-density channel spacing. The output of the second MZI 406 is also connected to a relatively low density demultiplexer 416. As discussed below in more detail, the center wavelengths for the channels of the lower demultiplexer 417 are offset relative to the center wavelength for the channels of the upper demultiplexer 416.

Figure 5:
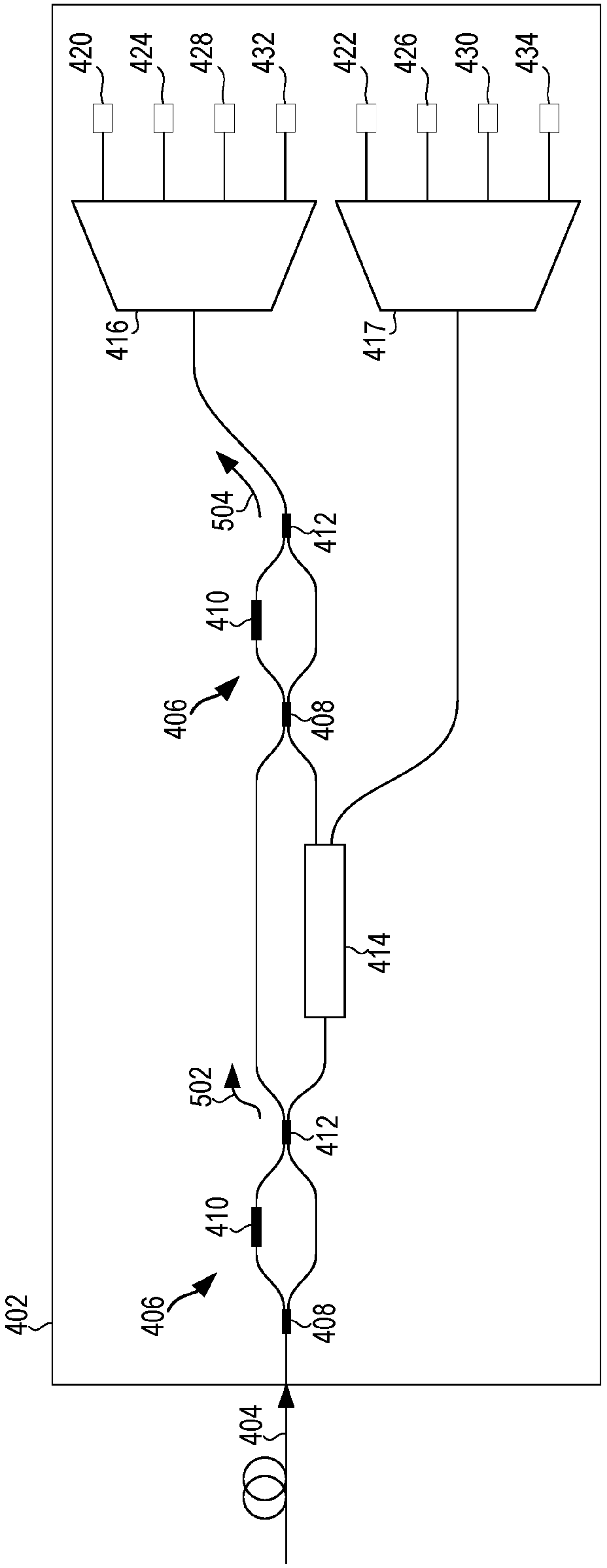
FIG. 5 is a simplified block diagram showing the PIC die of FIG. 4 in one configuration.

In use, the PIC die 402 may be configured for channels that are either relatively closely spaced or relatively far apart. In one configuration, with relatively low-density channel spacing such as FR4, light from the optical fiber 404 is directed by the first MZI 406 to the top path 502, as shown in FIG. 5. In such a configuration, each of the MZIs 406 may be considered to be in the "bar" state, with the phase of each phase shifter 410 set to r. The wavelength interleaver 414, with narrow passbands, is bypassed, allowing operation of the device with channels that are relatively widely spaced apart. The light from that path is then directed by the second MZI 406 to the top path 504, towards the demultiplexer 416. The light from the optical fiber 404 is split into four channels 420, 424, 428, 432. The spacing between the four channels 420, 424, 428, 432 is, in the illustrative embodiment, 20 nanometers.

Figure 6:
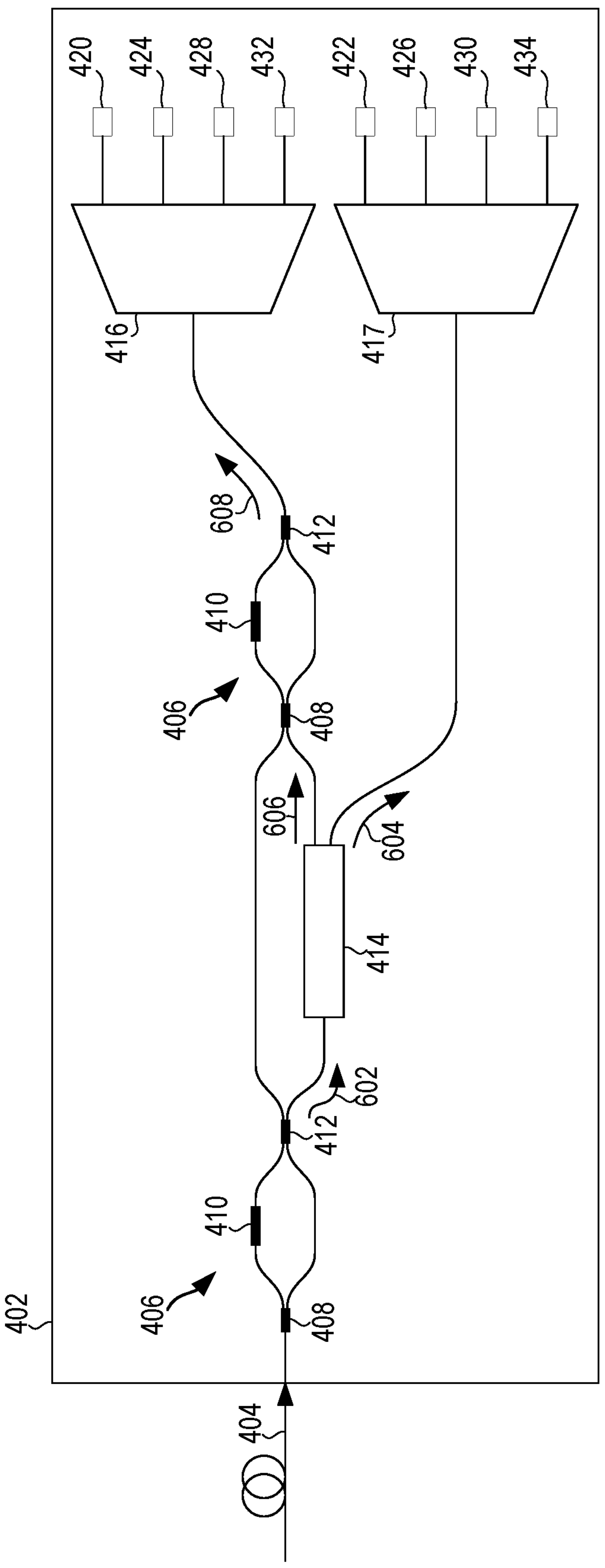
FIG. 6 is a simplified block diagram showing the PIC die of FIG. 4 in one configuration.

In another configuration, with relatively high-density channel spacing, such as FR8, light from the optical fiber 404 is directed by the first MZI 406 to the lower path 602, as shown in FIG. 6. In such a configuration, each of the MZIs 406 may be considered to be in the "cross" state, with the phase of each phase shifter 410 set to 0. The interleaver 414 deinterleaves the channels, sending light in, e.g., every odd channel to the lower path 604 and every even channel to the upper path 606. Light from the upper path 606 is directed by a second MZI 406 to the upper demultiplexer 416. Light from the lower path 604 is directed to the lower demultiplexer 417.

Figure 7:
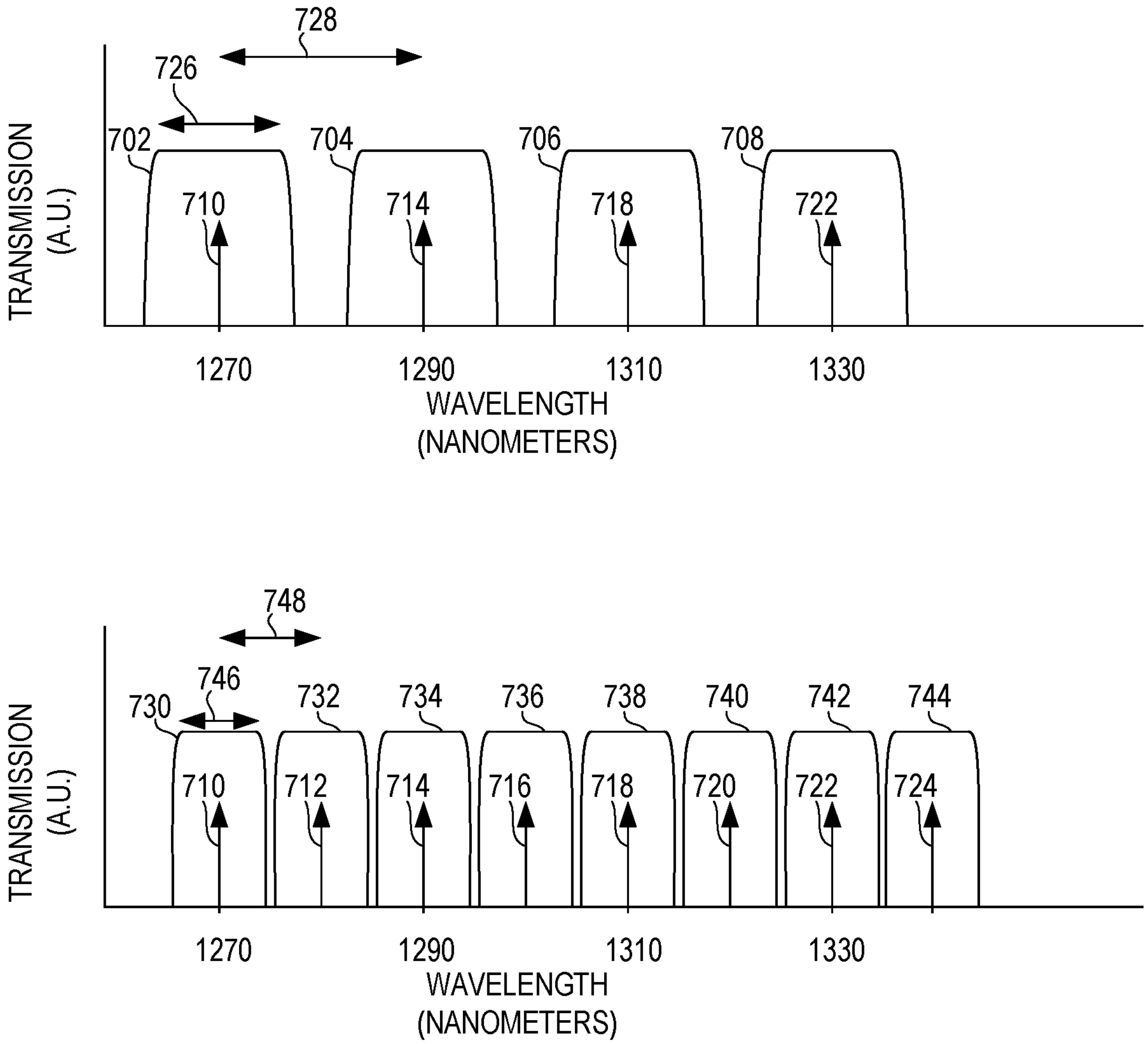
FIG. 7 is a simplified plot showing channel spacing in different multiplexing schemes.

FIG. 7 shows example channel sets for a four-channel configuration (top plot) and a denser eight-channel configuration (bottom plot). Each plot shows an idealized filter defining each channel. In the four-channel configuration, channels 702, 704, 706, and 708 have center wavelengths at 1270 nanometers, 1290 nanometers, 1310 nanometers, and 1330 nanometers, respectively. The passband 726 of each channel 702, 704, 706, and 708 is about 13 nanometers, and the spacing 728 between channels 702, 704, 706, and 708 is 20 nanometers. In the eight-channel configuration, channels 730, 732, 734, 736, 738, 740, 742, and 744 have center wavelengths at 1270 nanometers, 1280 nanometers, 1290 nanometers, 1300 nanometers, 1310 nanometers, 1320 nanometers, 1330 nanometers, and 1340 nanometers, respectively. The passband 746 of each channel 730, 732, 734, 736, 738, 740, 742, and 744 is about 6-7 nanometers, and the spacing 748 between channels 730, 732, 734, 736, 738, 740, 742, and 744 is 10 nanometers.

Figure 8:
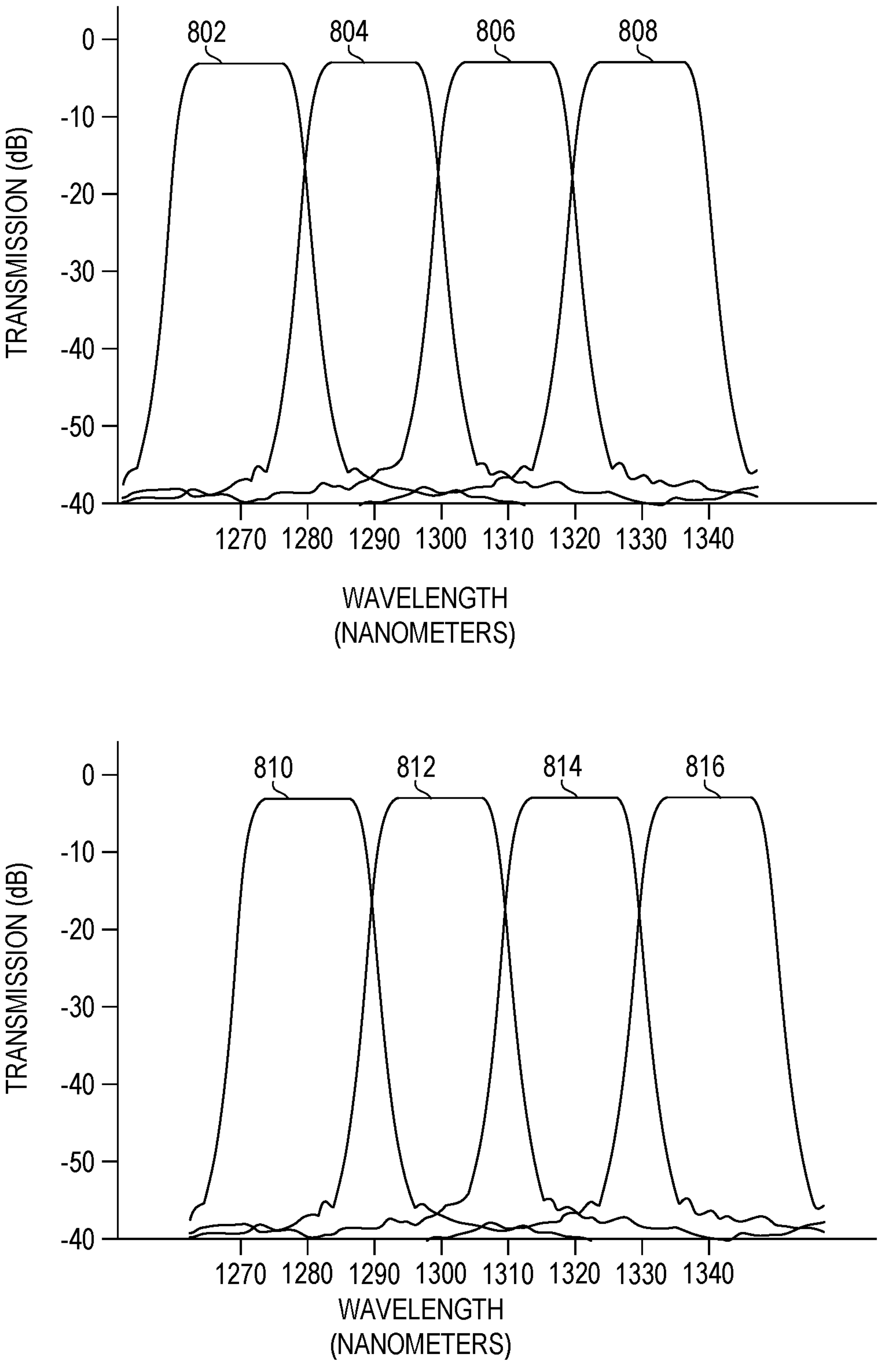
FIG. 8 shows simplified plots of various spectra associated with the PIC die of FIG. 4.
Figure 10:
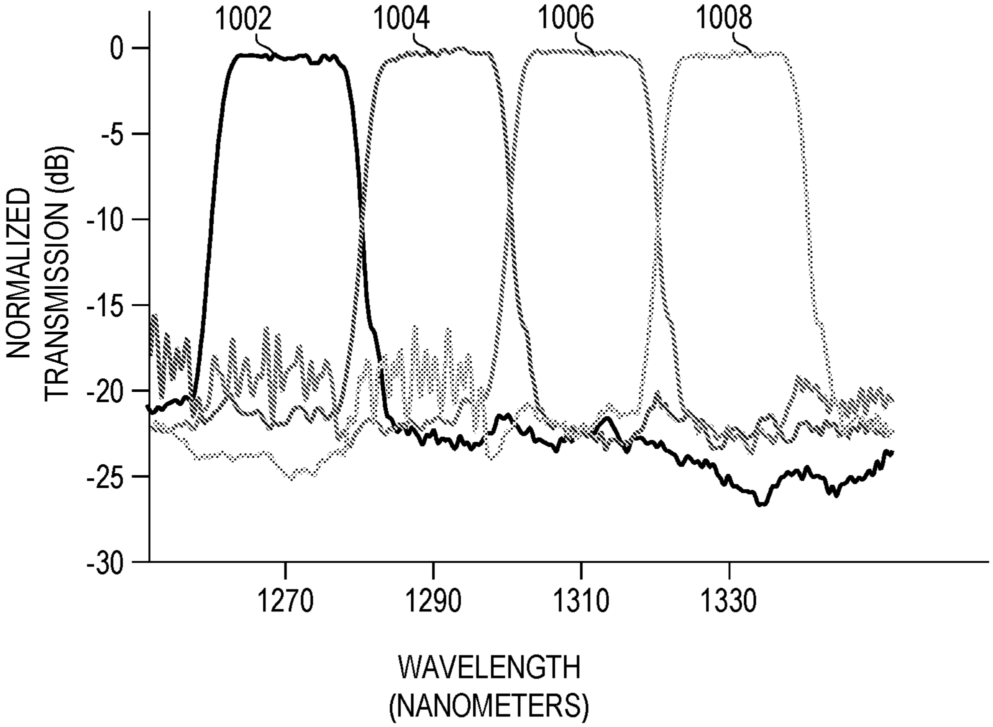
FIG. 10 shows a simplified plot of various spectra associated with the PIC die of FIG. 4.

FIG. 8 shows example transmission spectra for channels of the demultiplexer 416 (top plot) and example transmission spectra for channels of the demultiplexer 417 (bottom plot). The transmission spectra 802, 804, 806, 808 correspond to outputs 420, 424, 428, 432, respectively, and transmission spectra 810, 812, 814, 816 correspond to outputs 422, 426, 430, 434, respectively. FIG. 10 shows another exampled measured transmission spectra for channels of the demultiplexer 416.

Figure 9:
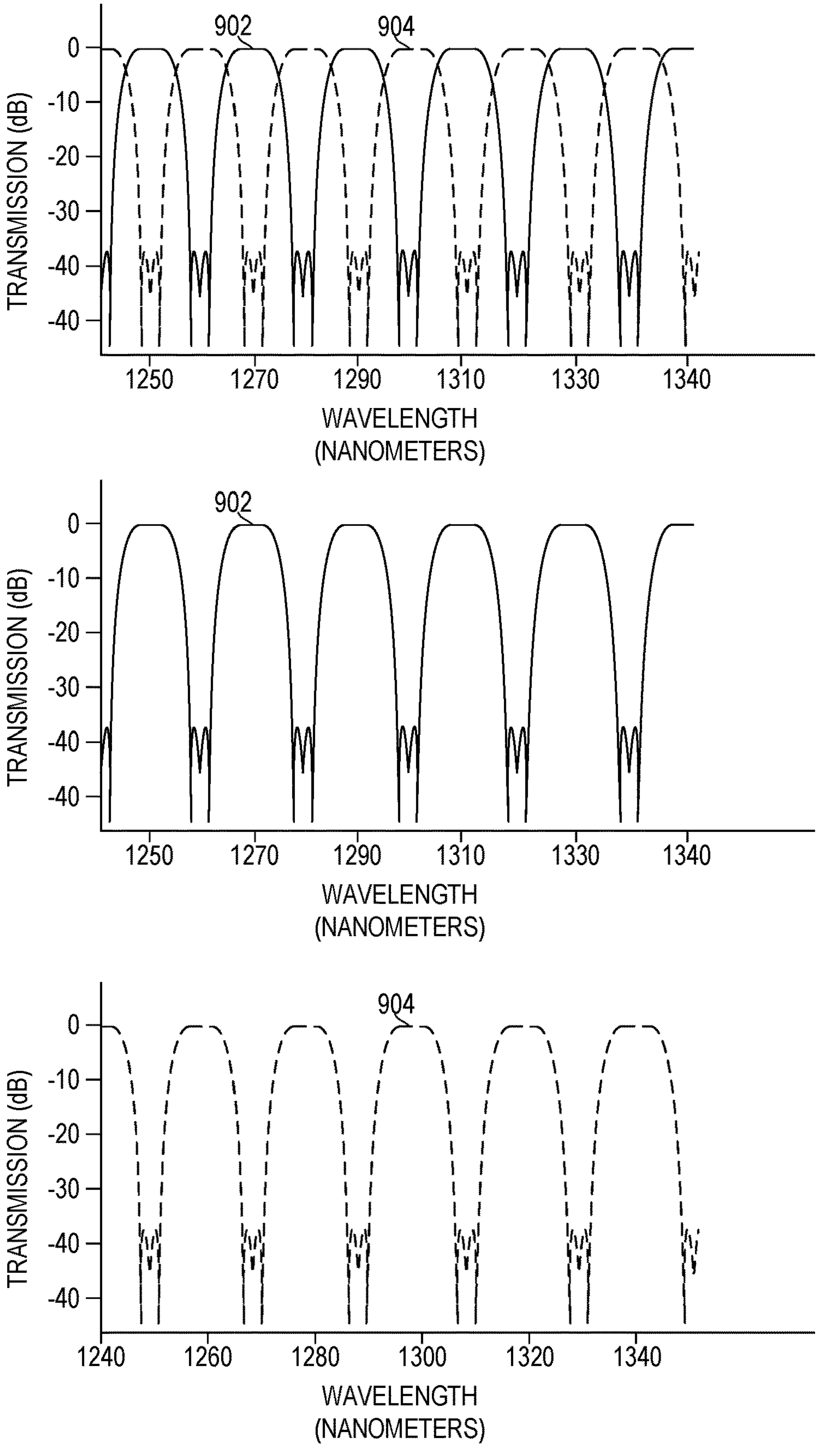
FIG. 9 shows simplified plots of various spectra associated with the PIC die of FIG. 4.

FIG. 9 shows example transmission spectra for the two outputs of the wavelength interleaver 414. In the illustrative embodiment, the spectrum 902 corresponds to the top output that is connected to the second MZI 406, and the spectrum 904 corresponds to the bottom output that is connected to the demultiplexer 417.

Although the example shown describe increases from four O-band channels to eight O-band channels at the bandwidths shown, the techniques described herein may be applicable to any suitable configuration, such as C-band, L-band, S-band, configurations with 2-64 channels, configurations with channel bandwidth from 2-50 nanometers, etc. The techniques described herein may be applicable when increasing channel density by a factor of 2, 3, 4, etc.

The configurable demultiplexer on the PIC die 402 may be set once when first connected to other equipment and then continue operation without any additional input. The configurable demultiplexer may be implemented in various configurations in a single receiver PIC die 402. It can be implemented in one single integrated silicon photonics chip, without WDM system performance tradeoff, and with very little additional complexity or power consumption. The configurable demultiplexer is compatible with any suitable silicon photonics manufacturing process lines. In some embodiments, the configurable demultiplexer allows athermal wavelength operation at two set-and-forget modes. In such embodiments, there may be no active tuning/tracking demultiplexer wavelengths in feedback-loop detection, providing reliability, cost/energy saving, and ease of manufacturability. An integrated configurable demultiplexer may be used for any suitable application, such as 800G-FR8/LR8, 1.6T FR8/LR8, 3.2T FR8/LR8, enabling system backward compatibility with traditional 800G-FR4, 1.6T-2xFR4 solutions.

The PIC die 402 may be made of any suitable material, such as silicon, silicon oxide, silicon nitride, silicon-on-insulator, gallium arsenide, polymer, etc. In an illustrative embodiment, waveguides in the PIC die 402 may be silicon waveguides embedded in silicon oxide cladding. In other embodiments, the waveguides may be silicon oxide, silicon nitride, or other suitable material in any suitable cladding. In some embodiments, the PIC die 402 may include several copies of the components shown in FIG. 4, such as 1-1,024 copies. In the illustrative embodiment, the outputs of the demultiplexers 416, 417 are connected photodetectors that can convert the optical signals to electrical signals. In other embodiments, the outputs of the demultiplexers 416, 417 may be connected to other components, such as another PIC die or optical fibers.

In some embodiments, the PIC die 402 may include additional active or passive optical elements not shown in FIG. 4, such as splitters, couplers, filters, optical amplifiers, lasers, photodetectors, modulators, etc. The PIC die 402 may have electrical connections to a substrate and/or electrical integrated circuit die, such as for setting phase shifters 410, power delivery, sending and receiving data, and/or the like. The PIC die 402 may include components to control the MZIs 406, such as heaters, electro-optic components, current injectors, etc. Light transmitters and receivers on or off the PIC die 402 may be cooled or uncooled. In some embodiments, the PIC die 402 may include polarization diversity circuits for TE and TM mode splits, not shown here.

The incoming optical fiber 404 may be any suitable optical fiber, such as a single-mode silica fiber. The optical fiber 404 may be coupled to waveguides on the PIC die 402 in any suitable manner, such as using a connector, V-grooves, expanded beam coupling, etc. In some embodiments, light may be coupled to the PIC die 402 from a source other than an optical fiber 404, such as a free-space beam or another PIC die. Outputs to the PIC die 402 (e.g., connections to the outputs of the demultiplexers 416, 417) may be connected in a similar manner as the input. Although the device was described above as acting a demultiplexer, it should be appreciated that the device can operate in the same manner as a multiplexer, with laser light inputs provided to the multiplexers 416, 417 and the output provided to the fiber 404.

In use, the PIC die 402 may be connected to or form part of another component, such as a network switch, a router, a network interface controller, etc. For example, the PIC die 402 may be connected to an input port of a router. Light in multiple channels is provided by the fiber 404. The PIC die 402 is configured as, e.g., either an FR4-compatible device or an FR8-compatible device, depending on the configuration of the router and the device providing the input light. The PIC die 402 demultiplexes the light into several separate channels, which the photodetectors on the PIC die 402 or router can then detect. An output PIC die 402 may be connected to an output of the router. The PIC die 402 or router can generate signals in, e.g., four or eight channels, and provide either four inputs to the demultiplexer 416 or eight inputs to the demultiplexers 416, 417. The output PIC die 402 may be configured for four or eight inputs, accordingly. The fiber 404 collects the output of the output PIC die and sends it to another device. More generally, it should be appreciated that the configurable demultiplexer shown in FIG. 4 may be at one or both ends of any suitable interconnect, such as an interconnect between components of the computing system 100 described above, between different computing systems 100, between switches or switches and computing systems 100, etc.

In the illustrative embodiment, the MZIs 406 are made up of couplers 408, 412 and phase shifter 410. The phase shifter 410 may change the phase on the scale of microseconds (for, e.g., thermal-optical phase shifter) or on the scale of nanoseconds (for, e.g., electro-optical phase shifter). The adaptive optical demultiplexer bandwidth receiver PIC operates at set-and-forget, hitless modes for the entire operating temperature and the product lifetime. In some embodiments, the MZIs may be replaced with a different type of switch, such as a switch that is part of the PIC die or separate from the PIC die. Such an integrated solution is also suitable for future applications such as 800G FR8/LR8, 1.6T FR8/LR8, and 3.2T FR8/LR8. It should be appreciated that the configurable demultiplexer shown in FIG. 6 may be at one or both ends of any suitable interconnect, such as an interconnect between components of the computing system 100 described above, between different compute devices 100, between switches or switches and compute devices 100, etc. In some embodiments, the MZIs 406 may be replaced with a different type of switch, such as a switch that is part of the PIC die 402 or separate from the PIC die 402. Such an integrated solution may be suitable for future applications such as 800G FR8/LR8, 1.6T FR8/LR8, and 3.2T FR8/LR8.

In the illustrative embodiment, the couplers 408, 412 are 50/50 couplers that operate by bringing two waveguides (e.g., the waveguide coupled to the input fiber 404 and another waveguide defined in the PIC die 402) close together for a particular distance so that the modes overlap, causing coupling between the two of them. In other embodiments, a different type of couplers may be used. The illustrative phase shifter 410 operates by heating up an area of the waveguide in one arm of the MZI 406. In other embodiments, the phase shifter 410 may operate in a different manner, such as using an electro-optic effect.

As discussed above, in the illustrative embodiment, the channels for a four-channel configuration have a channel passband of about 13 nanometers with spacing between channels of about 20 nanometers. The channels for an eight-channel configuration have a channel passband of about 6-7 nanometers with spacing between channels of about 10 nanometers. In other embodiments, any suitable number of channels may be used for the low-density and high-density configurations, such as 2-32 or 4-64, respectively. The low-density and high-density configurations may have any suitable channel passband and spacing, such as channel passbands of 50-2 or 25-1 nanometer, respectively, or channel spacing of 40-2 or 20-1 nanometer, respectively. Of course, the channel passband will be less than or equal to the channel spacing. Each channel may carry any suitable bandwidth, such as 10-1,024 gigabits per second.

Figure 11:
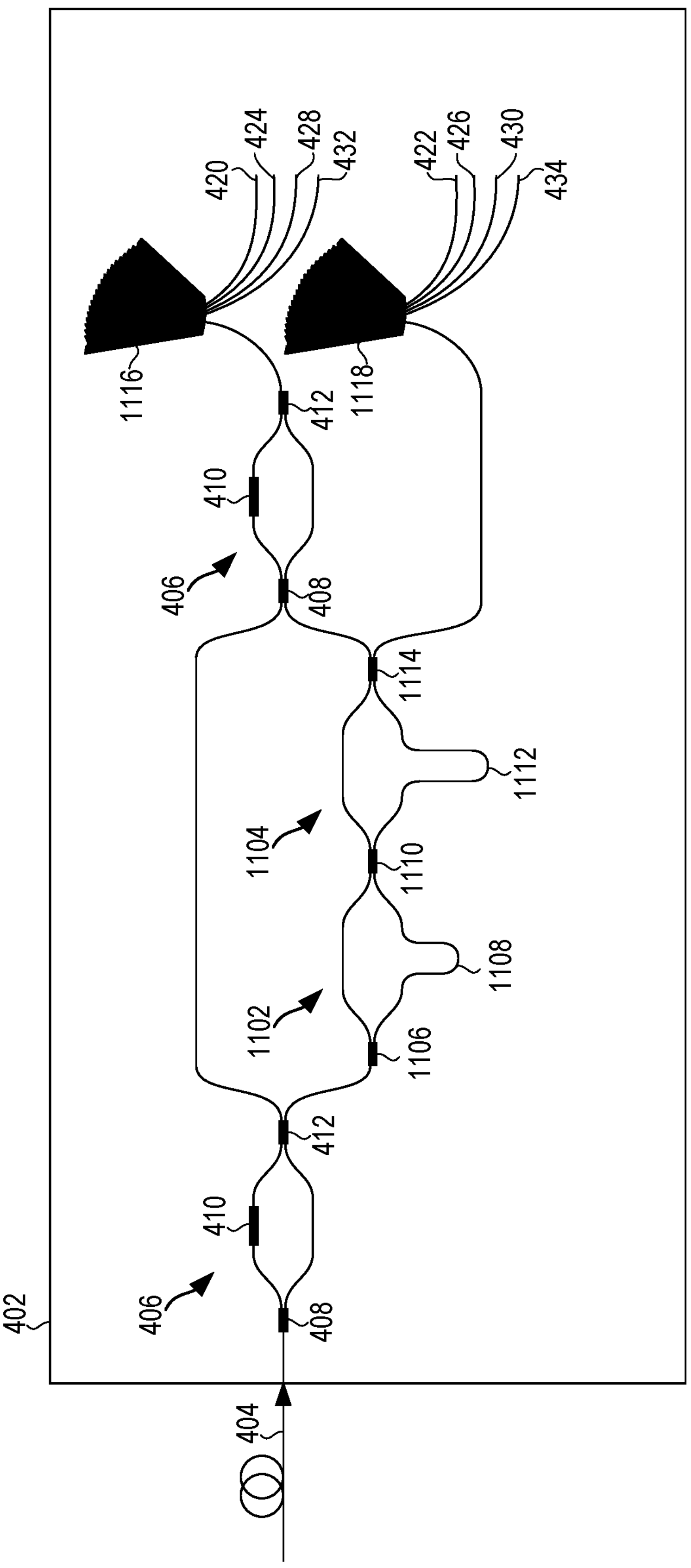
FIG. 11 is a simplified block diagram showing one embodiment of the PIC die of FIG. 4.
Figure 12:
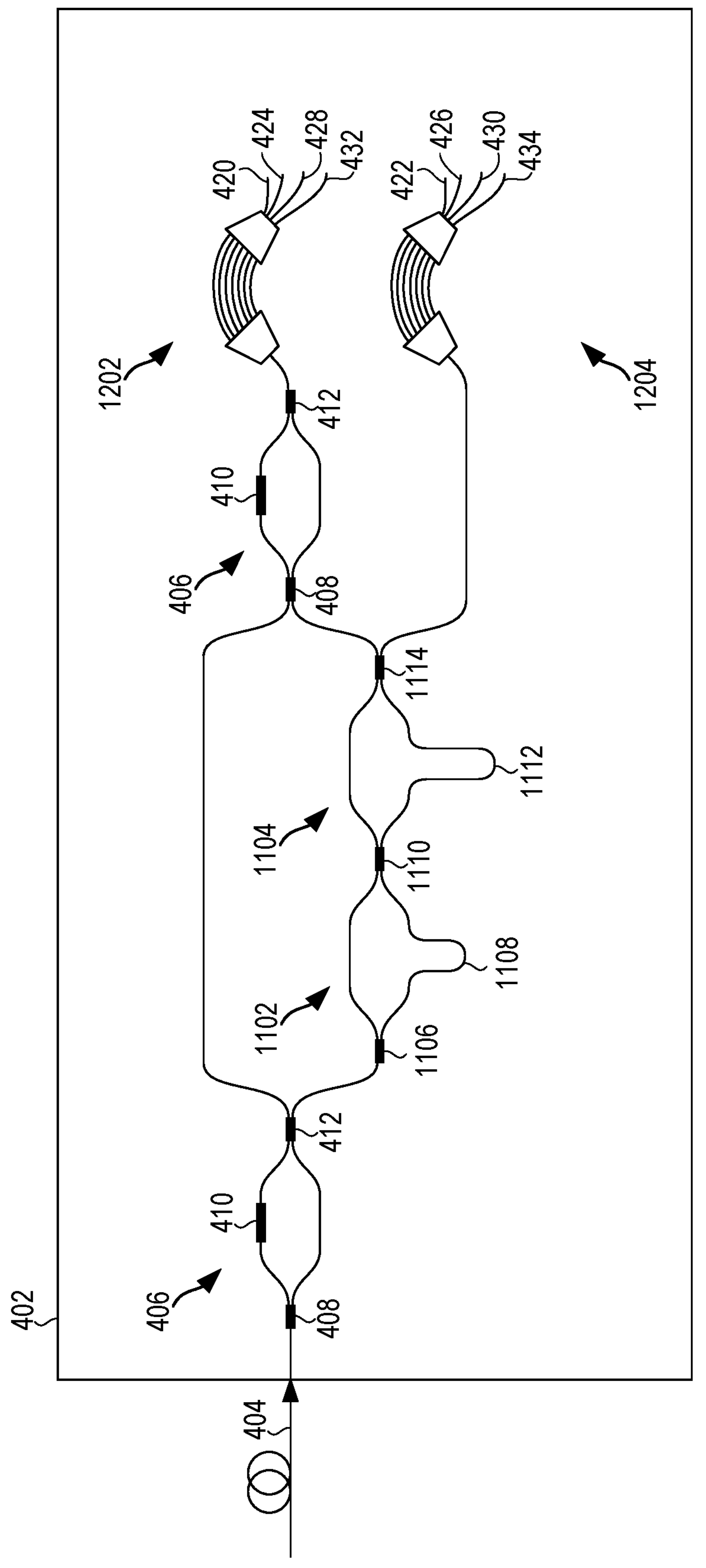
FIG. 12 is a simplified block diagram showing one embodiment of the PIC die of FIG. 4.
Figure 13:
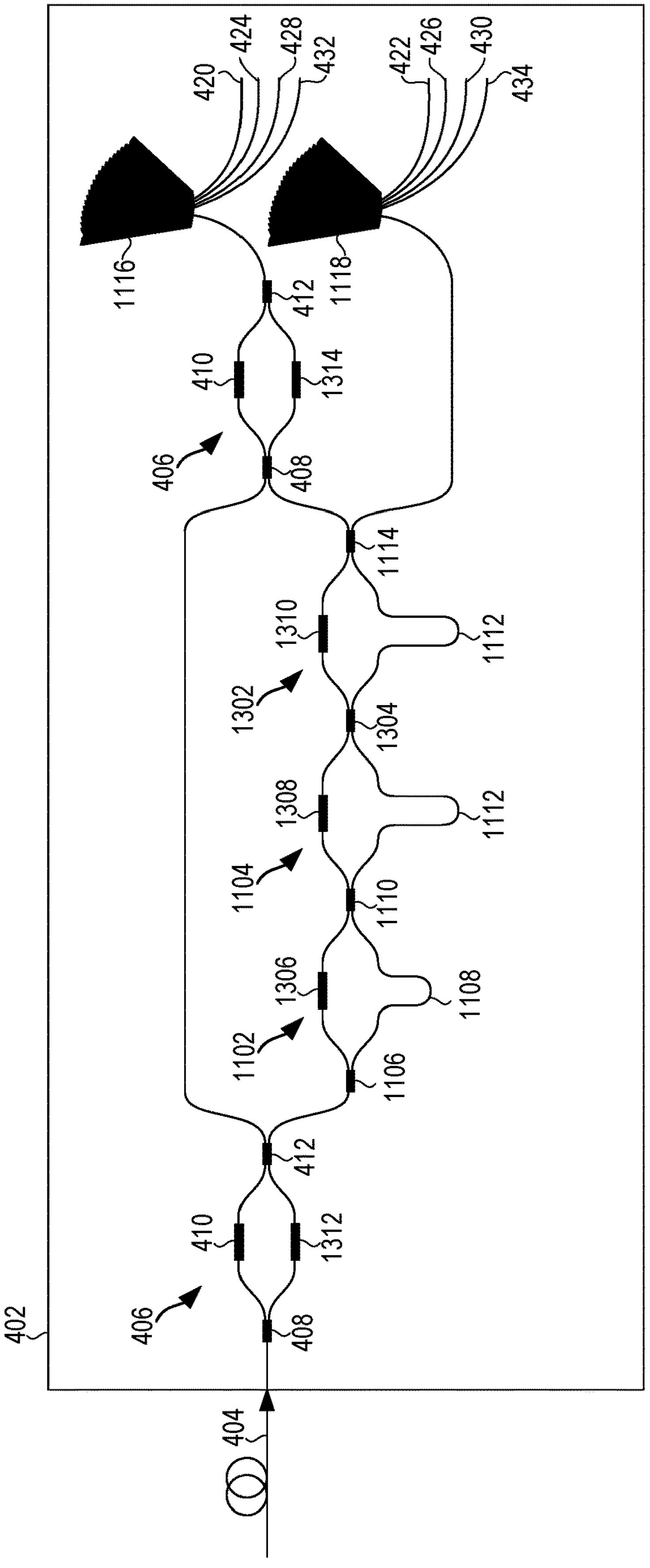
FIG. 13 is a simplified block diagram showing one embodiment of the PIC die of FIG. 4.
Figure 14:
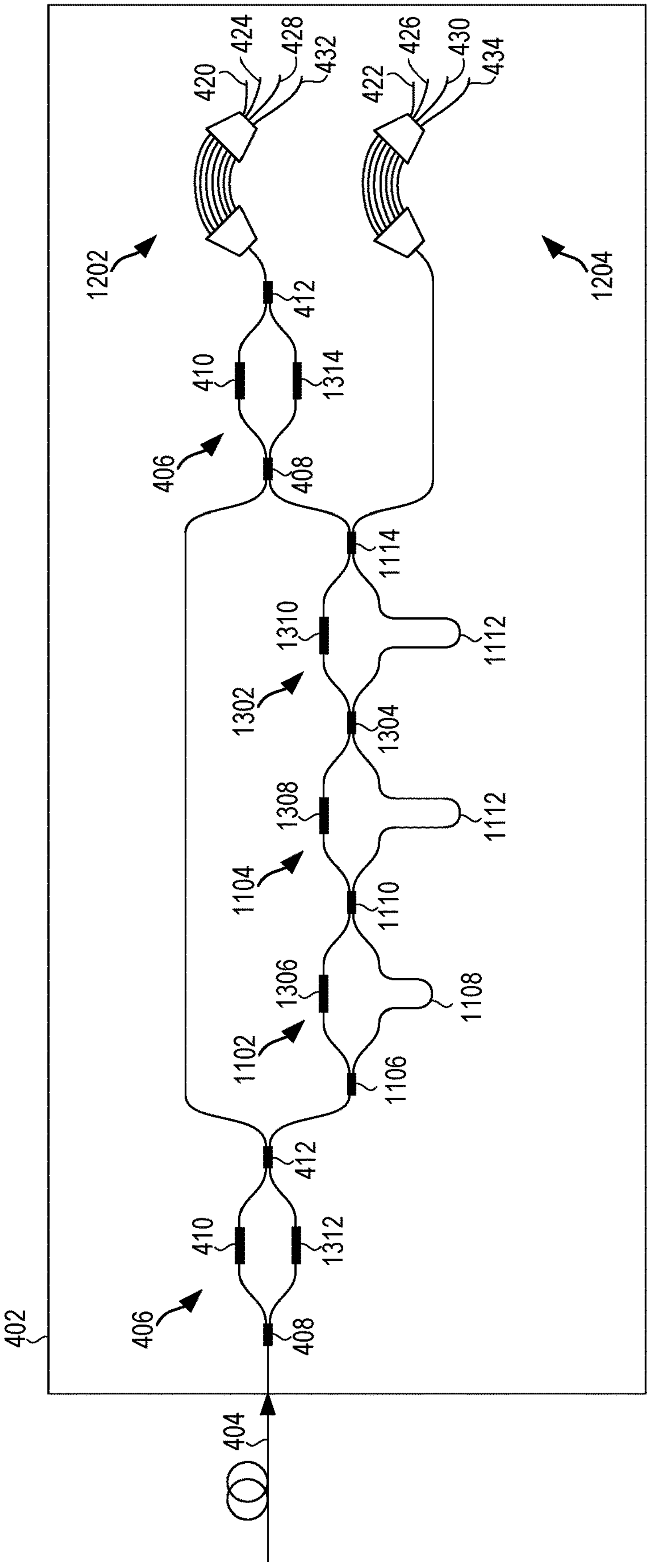
FIG. 14 is a simplified block diagram showing one embodiment of the PIC die of FIG. 4.

The interleaver 414 may be any suitable type of interleaver. In one embodiment, the interleaver 414 may be embodied as two MZIs 1102, 1104 connected to each other, as shown in FIGS. 11 and 12. Some or all of the couplers 1106, 1110, and 1114 for the MZIs 1102, 1104 may not be 50/50 couplers, and the coupling ratios for them may be selected based on a desired filtering effect of the MZIs 1102, 1104. For example, in one embodiment, the coupling ratio of the coupler 1106 may be 50/50, the coupling ratio of the coupler 1110 may be 20/80, and the coupling ratio of the coupler 1114 may be 2/98 (expressed in percent), which may achieve flatter, more square optical interleaved spectra. The first MZI 1102 has an additional optical path length 1108 in one arm equal to L, and the second MZI 1104 has an additional optical path length 1112 in one arm equal to 2L, where L is the spacing between channels. In some embodiments, the interleaver 414 may include a third MZI 1302 with an optical path length difference of 2L, as shown in FIGS. 13 and 14. Additionally or alternatively, in some embodiments, the various MZIs 406, 1102, 1104, 1302 may have additional phase shifters 1312, 1306, 1308, 1310, and 1314, allowing for push-and-pull modes, phase error corrections, and additional flexibility.

The demultiplexers 416, 417 may be any suitable type of demultiplexers. In one embodiment, the demultiplexers 416, 417 may be embodied as Echelle gratings 1116, 1118, respectively, as shown in FIGS. 11 and 13. In another embodiment, the demultiplexers 416, 417 may be embodied as arrayed waveguide gratings (AWGs) 1202, 1204, as shown in FIGS. 12 and 14.

Figure 15:
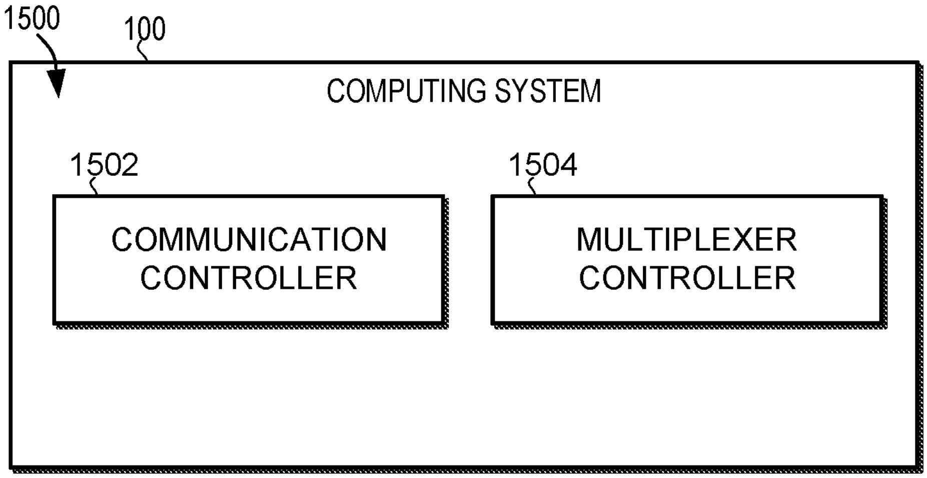
FIG. 15 illustrates a simplified block diagram of an environment that can be established by the computing system of FIG. 1.

Referring now to FIG. 15, in an illustrative embodiment, the computing system 100 establishes an environment 1500 during operation. The illustrative environment 1500 includes a communication controller 1502 and a multiplexer controller 1504 (which may also be referred to as a demultiplexer controller 1504). The various modules of the environment 1500 may be embodied as hardware, software, firmware, or a combination thereof. For example, the various modules, logic, and other components of the environment 1500 may form a portion of, or otherwise be established by, the processor 105 or other hardware components of the computing system 100 such as the memory 110, the root complex 115, etc. As such, in some embodiments, one or more of the modules of the environment 1500 may be embodied as circuitry or collection of electrical devices (e.g., communication controller circuitry 1502, multiplexer controller circuitry 1504, etc.). It should be appreciated that, in such embodiments, one or more of the circuits (e.g., the communication controller circuitry 1502, the multiplexer controller circuitry 1504, etc.) may form a portion of one or more of the processor 105, the memory 110, the I/O subsystem 106, the root complex 115, and/or other components of the computing system 100. For example, in some embodiments, some or all of the modules may be embodied as the processor 105 as well as the memory 110 and/or data storage storing instructions to be executed by the processor 105. Additionally, in some embodiments, one or more of the illustrative modules may form a portion of another module and/or one or more of the illustrative modules may be independent of one another. Further, in some embodiments, one or more of the modules of the environment 1500 may be embodied as virtualized hardware components or emulated architecture, which may be established and maintained by the processor 102 or other components of the computing system 100. It should be appreciated that some of the functionality of one or more of the modules of the environment 1500 may require a hardware implementation, in which case embodiments of modules which implement such functionality will be embodied at least partially as hardware.

The communication controller 1502, which may be embodied as hardware, firmware, software, virtualized hardware, emulated architecture, and/or a combination thereof as discussed above, is configured to send and receive data, either within components of the computing system 100 or between different computing systems 100. The communication controller 1502 may use any suitable protocol, such as Ethernet, Wi-Fi, PCI, CXL, etc. In some embodiments, the communication controller 1502 is configured to control the configuration of the PIC die 402. In particular, the communication controller 1502 can instruct the multiplexer controller 1504 to configure the PIC die 402, such as configure the PIC die 402 to be in a four-channel or eight-channel configuration.

The multiplexer and/or demultiplexer controller 1504, which may be embodied as hardware, firmware, software, virtualized hardware, emulated architecture, and/or a combination thereof, as discussed above, is configured to control the configurable multiplexer shown in FIG. 4. In particular, the multiplexer and/or demultiplexer controller 1504 is configured to determine a set of channels that are to be sent through the multiplexer shown in FIG. 4 and configure the multiplexer accordingly. The multiplexer and/or demultiplexer controller 1504 may control one or more switches, such as by controlling a heater, an electro-optic component, a charge-density-based switch, and/or the like.

Figure 16:
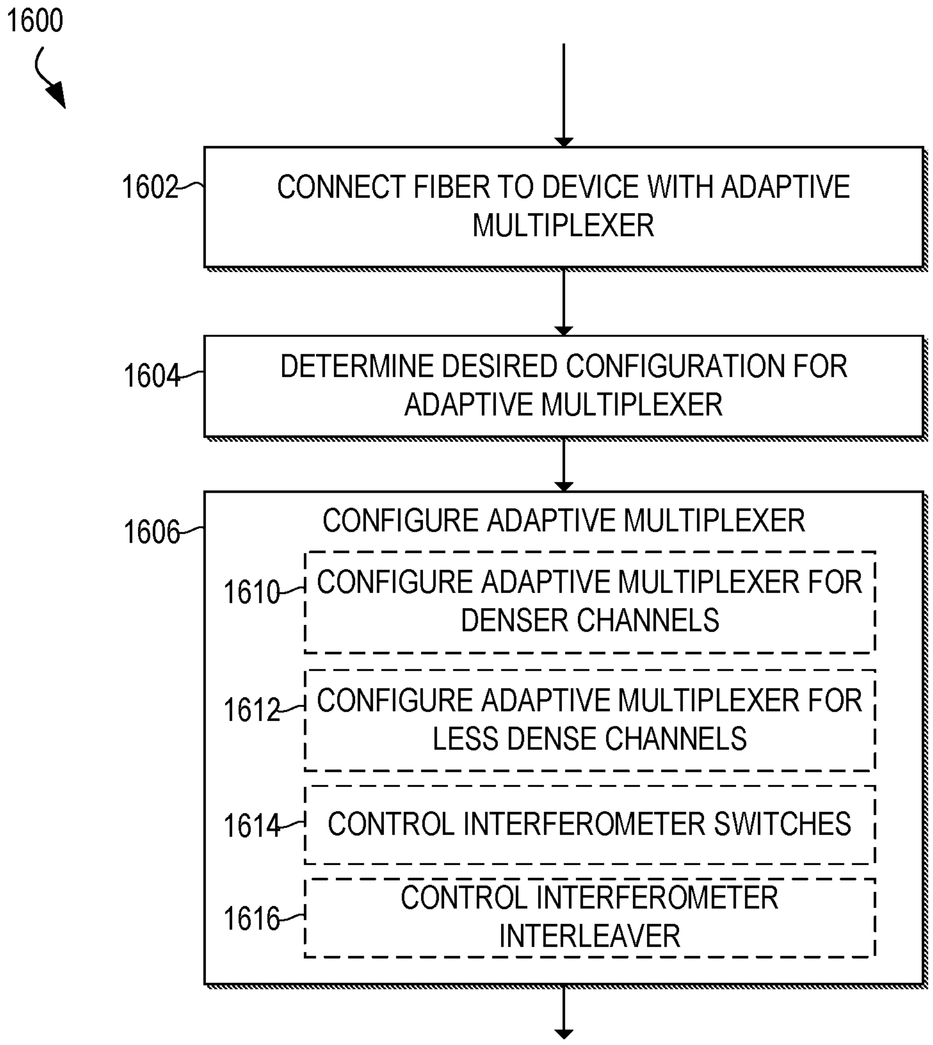
FIG. 16 illustrates a simplified flow diagram of at least one embodiment of a method for configuring the PIC die of FIG. 4.

Referring now to FIG. 16, in one embodiment, a method 1600 for configuring the PIC die 402 is shown. In the illustrative embodiment, the method 1600 begins in block 1602, in which a fiber 404 is connected to the PIC die 402, such as using a connector or a V-groove.

In block 1604, the desired configuration for the adaptive demultiplexer on the PIC die 402 is determined. For example, an administrator may determine whether a relatively low-density channel spacing is being used or whether a relatively high-density channel spacing is being used.

In block 1606, the adaptive demultiplexer on the PIC die 402 is configured. In some embodiments, an administrator may configure software, firmware, or hardware on the computing system 100 to configure the PIC die 402. In other embodiments, an administrator may configure, e.g., one or more switches connected to the PIC die 402.

In block 1610, the adaptive demultiplexer may be configured for denser channels. In block 1612, the adaptive multiplexer may be configured for less dense channels. In block 1614, the MZIs 406 may be controlled, such as by controlling the phase shifters 410. In block 1616, the wavelength interleaver may be controlled, such as by controlling the MZIs 1102, 1104, 1302 and/or the phase shifters 1306, 1308, 1310.

Figure 17:
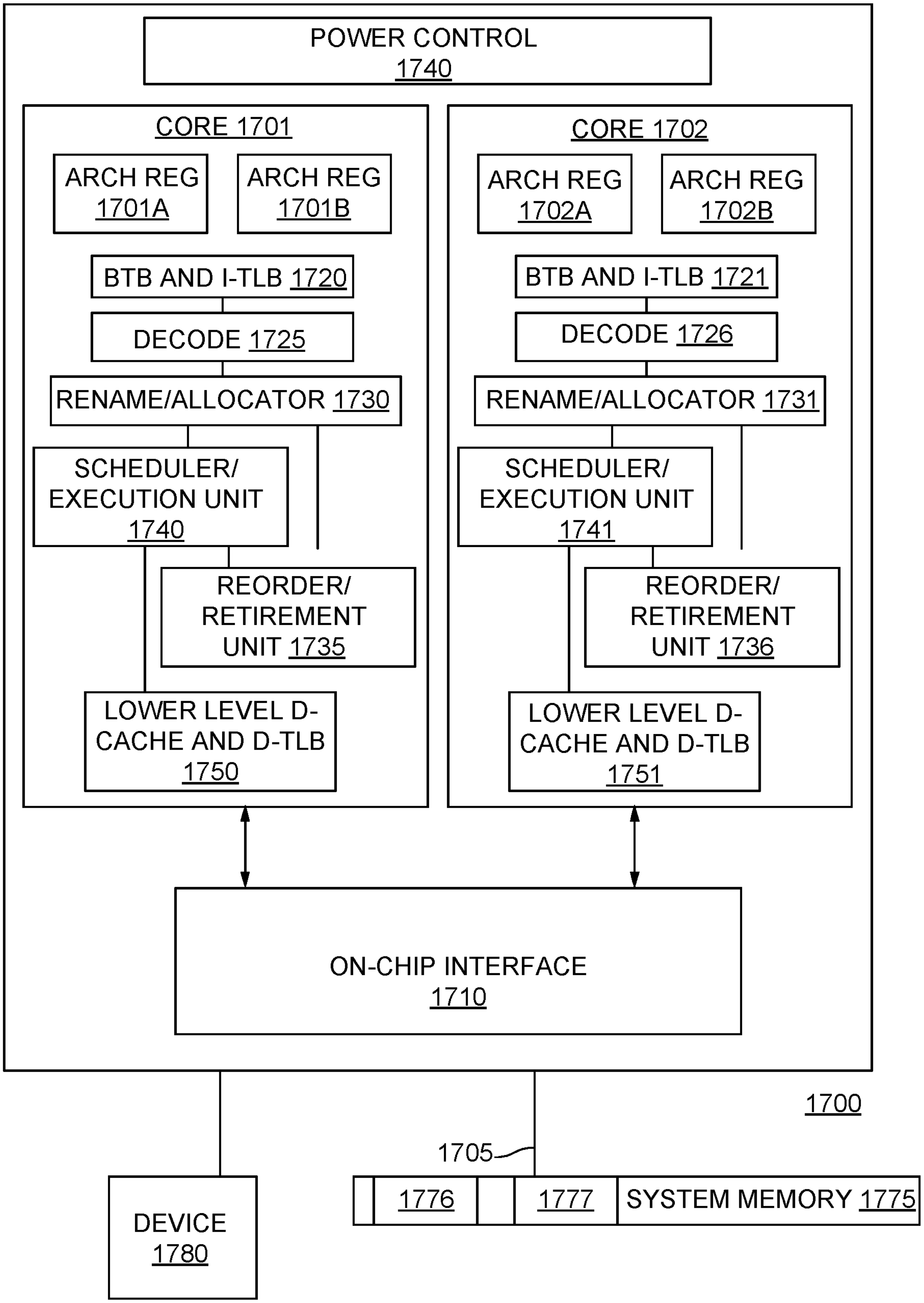
FIG. 17 illustrates an embodiment of a block diagram for a computing system including a multicore processor.

Referring to FIG. 17, an embodiment of a block diagram for a computing system including a multicore processor is depicted. Processor 1700 includes any processor or processing device, such as a microprocessor, an embedded processor, a digital signal processor (DSP), a network processor, a handheld processor, an application processor, a co-processor, a system on a chip (SOC), or other device to execute code. Processor 1700, in one embodiment, includes at least two cores—core 1701 and 1702, which may include asymmetric cores or symmetric cores (the illustrated embodiment). However, processor 1700 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 1700, as illustrated in FIG. 17, includes two cores—core 1701 and 1702. Here, core 1701 and 1702 are considered symmetric cores, i.e. cores with the same configurations, functional units, and/or logic. In another embodiment, core 1701 includes an out-of-order processor core, while core 1702 includes an in-order processor core. However, cores 1701 and 1702 may be individually selected from any type of core, such as a native core, a software managed core, a core adapted to execute a native Instruction Set Architecture (ISA), a core adapted to execute a translated Instruction Set Architecture (ISA), a co-designed core, or other known core. In a heterogeneous core environment (i.e. asymmetric cores), some form of translation, such a binary translation, may be utilized to schedule or execute code on one or both cores. Yet to further the discussion, the functional units illustrated in core 1701 are described in further detail below, as the units in core 1702 operate in a similar manner in the depicted embodiment.

As depicted, core 1701 includes two hardware threads 1701*a* and 1701*b*, which may also be referred to as hardware thread slots 1701*a* and 1701*b*. Therefore, software entities, such as an operating system, in one embodiment potentially view processor 1700 as four separate processors, i.e., four logical processors or processing elements capable of executing four software threads concurrently. As alluded to above, a first thread is associated with architecture state registers 1701*a*, a second thread is associated with architecture state registers 1701*b*, a third thread may be associated with architecture state registers 1702*a*, and a fourth thread may be associated with architecture state registers 1702*b*. Here, each of the architecture state registers (1701*a*, 1701*b*, 1702*a*, and 1702*b*) may be referred to as processing elements, thread slots, or thread units, as described above. As illustrated, architecture state registers 1701*a* are replicated in architecture state registers 1701*b*, so individual architecture states/contexts are capable of being stored for logical processor 1701*a* and logical processor 1701*b*. In core 1701, other smaller resources, such as instruction pointers and renaming logic in allocator and renamer block 1730 may also be replicated for threads 1701*a* and 1701*b*. Some resources, such as re-order buffers in reorder/retirement unit 1735, ILTB 1720, load/store buffers, and queues may be shared through partitioning. Other resources, such as general purpose internal registers, page-table base register(s), low-level data-cache and data-TLB 1715, execution unit(s) 1740, and portions of out-of-order unit 1735 are potentially fully shared.

Processor 1700 often includes other resources, which may be fully shared, shared through partitioning, or dedicated by/to processing elements. In FIG. 17, an embodiment of a purely exemplary processor with illustrative logical units/ resources of a processor is illustrated. Note that a processor may include, or omit, any of these functional units, as well as include any other known functional units, logic, or firmware not depicted. As illustrated, core 1701 includes a simplified, representative out-of-order (OOO) processor core. But an in-order processor may be utilized in different embodiments. The OOO core includes a branch target buffer 1720 to predict branches to be executed/taken and an instruction-translation buffer (I-TLB) 1720 to store address translation entries for instructions.

Core 1701 further includes decode module 1725 coupled to fetch unit 1720 to decode fetched elements. Fetch logic, in one embodiment, includes individual sequencers associated with thread slots 1701*a*, 1701*b*, respectively. Usually core 1701 is associated with a first ISA, which defines/specifies instructions executable on processor 1700. Often machine code instructions that are part of the first ISA include a portion of the instruction (referred to as an opcode), which references/specifies an instruction or operation to be performed. Decode logic 1725 includes circuitry that recognizes these instructions from their opcodes and passes the decoded instructions on in the pipeline for processing as defined by the first ISA. For example, as discussed in more detail below decoders 1725, in one embodiment, include logic designed or adapted to recognize specific instructions, such as transactional instruction. As a result of the recognition by decoders 1725, the architecture or core 1701 takes specific, predefined actions to perform tasks associated with the appropriate instruction. It is important to note that any of the tasks, blocks, operations, and methods described herein may be performed in response to a single or multiple instructions; some of which may be new or old instructions. Note decoders 1726, in one embodiment, recognize the same ISA (or a subset thereof). Alternatively, in a heterogeneous core environment, decoders 1726 recognize a second ISA (either a subset of the first ISA or a distinct ISA).

In one example, allocator and renamer block 1730 includes an allocator to reserve resources, such as register files to store instruction processing results. However, threads 1701*a* and 1701*b* are potentially capable of out-of-order execution, where allocator and renamer block 1730 also reserves other resources, such as reorder buffers to track instruction results. Unit 1730 may also include a register renamer to rename program/instruction reference registers to other registers internal to processor 1700. Reorder/retirement unit 1735 includes components, such as the reorder buffers mentioned above, load buffers, and store buffers, to support out-of-order execution and later in-order retirement of instructions executed out-of-order.

Scheduler and execution unit(s) block 1740, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 1750 are coupled to execution unit(s) 1740. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 1701 and 1702 share access to higher-level or further-out cache, such as a second level cache associated with on-chip interface 1710. Note that higher-level or further-out refers to cache levels increasing or getting further way from the execution unit(s). In one embodiment, higher-level cache is a last-level data cache-last cache in the memory hierarchy on processor 1700-such as a second or third level data cache. However, higher level cache is not so limited, as it may be associated with or include an instruction cache. A trace cache—a type of instruction cache-instead may be coupled after decoder 1725 to store recently decoded traces. Here, an instruction potentially refers to a macro-instruction (i.e. a general instruction recognized by the decoders), which may decode into a number of micro-instructions (micro-operations).

In the depicted configuration, processor 1700 also includes on-chip interface module 1710. Historically, a memory controller, which is described in more detail below, has been included in a computing system external to processor 1700. In this scenario, on-chip interface 1710 is to communicate with devices external to processor 1700, such as system memory 1775, a chipset (often including a memory controller hub to connect to memory 1775 and an I/O controller hub to connect peripheral devices), a memory controller hub, a northbridge, or other integrated circuit. And in this scenario, bus 1705 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 1775 may be dedicated to processor 1700 or shared with other devices in a system. Common examples of types of memory 1775 include DRAM, SRAM, non-volatile memory (NV memory), and other known storage devices. Note that device 1780 may include a graphic accelerator, processor or card coupled to a memory controller hub, data storage coupled to an I/O controller hub, a wireless transceiver, a flash device, an audio controller, a network controller, or other known device.

Recently however, as more logic and devices are being integrated on a single die, such as SOC, each of these devices may be incorporated on processor 1700. For example in one embodiment, a memory controller hub is on the same package and/or die with processor 1700. Here, a portion of the core (an on-core portion) 1710 includes one or more controller(s) for interfacing with other devices such as memory 1775 or a graphics device 1780. The configuration including an interconnect and controllers for interfacing with such devices is often referred to as an on-core (or un-core configuration). As an example, on-chip interface 1710 includes a ring interconnect for on-chip communication and a high-speed serial point-to-point link 1705 for off-chip communication. Yet, in the SOC environment, even more devices, such as the network interface, co-processors, memory 1775, graphics processor 1780, and any other known computer devices/interface may be integrated on a single die or integrated circuit to provide small form factor with high functionality and low power consumption.

In one embodiment, processor 1700 is capable of executing a compiler, optimization, and/or translator code 1777 to compile, translate, and/or optimize application code 1776 to support the apparatus and methods described herein or to interface therewith. A compiler often includes a program or set of programs to translate source text/code into target text/code. Usually, compilation of program/application code with a compiler is done in multiple phases and passes to transform hi-level programming language code into low-level machine or assembly language code. Yet, single pass compilers may still be utilized for simple compilation. A compiler may utilize any known compilation techniques and perform any known compiler operations, such as lexical analysis, preprocessing, parsing, semantic analysis, code generation, code transformation, and code optimization.

Larger compilers often include multiple phases, but most often these phases are included within two general phases: (1) a front-end, i.e. generally where syntactic processing, semantic processing, and some transformation/optimization may take place, and (2) a back-end, i.e. generally where analysis, transformations, optimizations, and code generation takes place. Some compilers refer to a middle, which illustrates the blurring of delineation between a front-end and back end of a compiler. As a result, reference to insertion, association, generation, or other operation of a compiler may take place in any of the aforementioned phases or passes, as well as any other known phases or passes of a compiler. As an illustrative example, a compiler potentially inserts operations, calls, functions, etc. in one or more phases of compilation, such as insertion of calls/operations in a front-end phase of compilation and then transformation of the calls/operations into lower-level code during a transformation phase. Note that during dynamic compilation, compiler code or dynamic optimization code may insert such operations/calls, as well as optimize the code for execution during runtime. As a specific illustrative example, binary code (already compiled code) may be dynamically optimized during runtime. Here, the program code may include the dynamic optimization code, the binary code, or a combination thereof.

Similar to a compiler, a translator, such as a binary translator, translates code either statically or dynamically to optimize and/or translate code. Therefore, reference to execution of code, application code, program code, or other software environment may refer to: (1) execution of a compiler program(s), optimization code optimizer, or translator either dynamically or statically, to compile program code, to maintain software structures, to perform other operations, to optimize code, or to translate code; (2) execution of main program code including operations/calls, such as application code that has been optimized/compiled; (3) execution of other program code, such as libraries, associated with the main program code to maintain software structures, to perform other software related operations, or to optimize code; or (4) a combination thereof.

Figure 18:
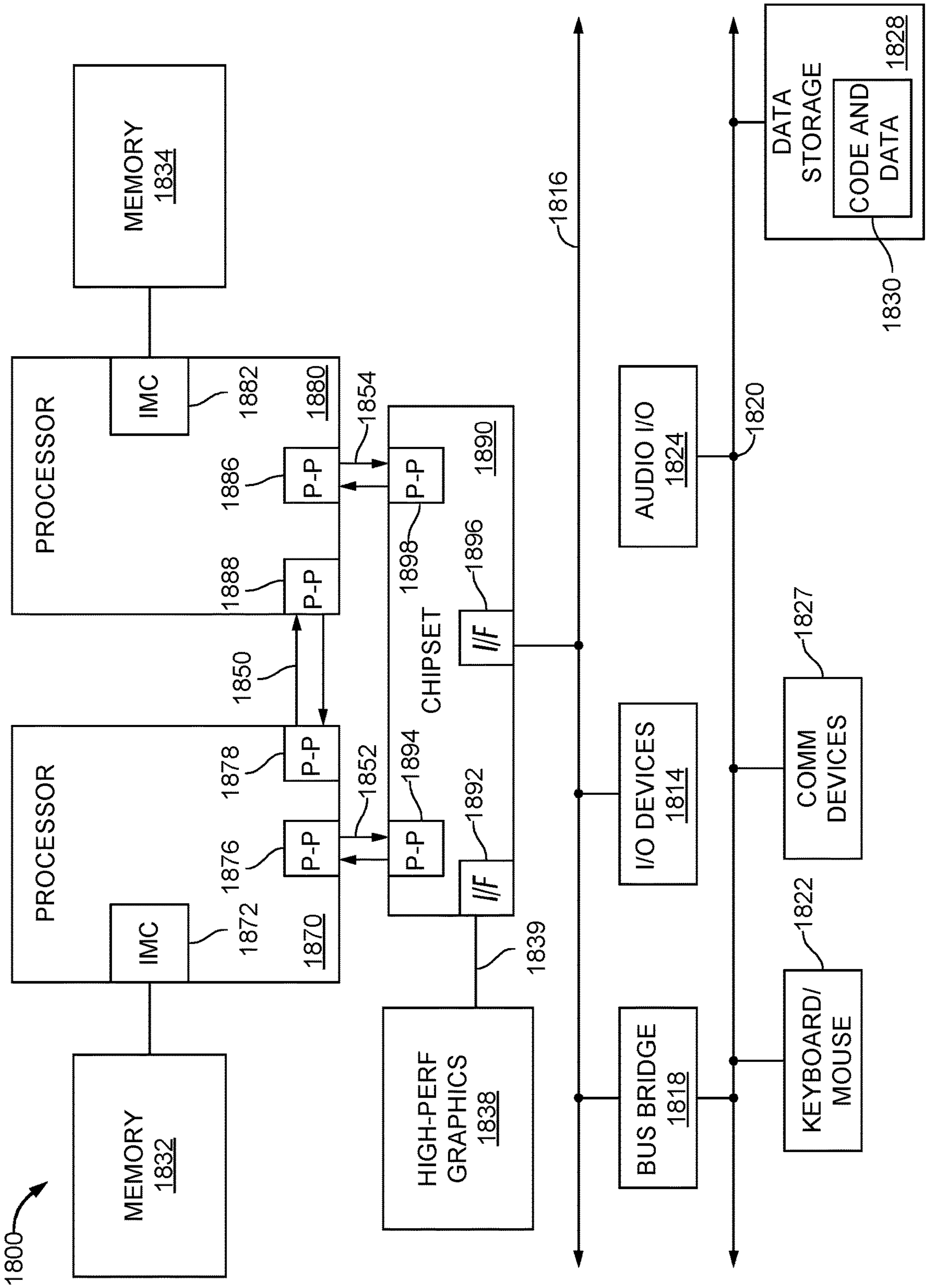
FIG. 18 illustrates an embodiment of a block for a computing system including multiple processors.

Referring now to FIG. 18, shown is a block diagram of another system 1800 in accordance with an embodiment of the present disclosure. As shown in FIG. 18, multiprocessor system 1800 is a point-to-point interconnect system, and includes a first processor 1870 and a second processor 1880 coupled via a point-to-point interconnect 1850. Each of processors 1870 and 1880 may be some version of a processor. In one embodiment, 1852 and 1854 are part of a serial, point-to-point coherent interconnect fabric, such as a high-performance architecture. As a result, aspects of the present disclosure may be implemented within the QPI architecture.

While shown with only two processors 1870, 1880, it is to be understood that the scope of the present disclosure is not so limited. In other embodiments, one or more additional processors may be present in a given processor.

Processors 1870 and 1880 are shown including integrated memory controller units 1872 and 1882, respectively. Processor 1870 also includes as part of its bus controller units point-to-point (P-P) interfaces 1876 and 1878; similarly, second processor 1880 includes P-P interfaces 1886 and 1888. Processors 1870, 1880 may exchange information via a point-to-point (P-P) interface 1850 using P-P interface circuits 1878, 1888. As shown in FIG. 18, IMCs 1872 and 1882 couple the processors to respective memories, namely a memory 1832 and a memory 1834, which may be portions of main memory locally attached to the respective processors.

Processors 1870, 1880 each exchange information with a chipset 1890 via individual P-P interfaces 1852, 1854 using point to point interface circuits 1876, 1894, 1886, 1898. Chipset 1890 also exchanges information with a high-performance graphics circuit 1838 via an interface circuit 1892 along a high-performance graphics interconnect 1839.

A shared cache (not shown) may be included in either processor or outside of both processors; yet connected with the processors via P-P interconnect, such that either or both processors' local cache information may be stored in the shared cache if a processor is placed into a low power mode.

Chipset 1890 may be coupled to a first bus 1816 via an interface 1896. In one embodiment, first bus 1816 may be a Peripheral Component Interconnect (PCI) bus, or a bus such as a PCI Express bus or another third generation I/O interconnect bus, although the scope of the present disclosure is not so limited.

As shown in FIG. 18, various I/O devices 1814 are coupled to first bus 1816, along with a bus bridge 1818 which couples first bus 1816 to a second bus 1820. In one embodiment, second bus 1820 includes a low pin count (LPC) bus. Various devices are coupled to second bus 1820 including, for example, a keyboard and/or mouse 1822, communication devices 1827 and a storage unit 1828 such as a disk drive or other mass storage device which often includes instructions/code and data 1830, in one embodiment. Further, an audio I/O 1824 is shown coupled to second bus 1820. Note that other architectures are possible, where the included components and interconnect architectures vary. For example, instead of the point-to-point architecture of FIG. 18, a system may implement a multi-drop bus or other such architecture.

While aspects of the present disclosure have been described with respect to a limited number of embodiments, those skilled in the art will appreciate numerous modifications and variations therefrom. It is intended that the appended claims cover all such modifications and variations as fall within the true spirit and scope of this present disclosure.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the present disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

EXAMPLES

Illustrative examples of the technologies disclosed herein are provided below. An embodiment of the technologies may include any one or more, and any combination of, the examples described below.

Example 1 includes a photonic integrated circuit (PIC) die comprising a first switch comprising an input, a first output, and a second output; a wavelength interleaver comprising an input, a first output, and a second output, wherein the first output of the first switch is connected to the input of the wavelength interleaver; and a second switch comprising a first input, a second input, and an output, wherein the first input of the second switch is connected to the second output of the first switch, wherein the second input of the second switch is connected to the first output of the wavelength interleaver.

Example 2 includes the subject matter of Example 1, and further including a first wavelength division multiplexer (WDM) comprising an input and a plurality of outputs, wherein the input of the first WDM is connected to the output of the second switch; and a second WDM comprising an input and a plurality of outputs, wherein the input of the second WDM is connected to the second output of the wavelength interleaver.

Example 3 includes the subject matter of any of Examples 1 and 2, and wherein the wavelength interleaver is to deinterleave a first set of channels from a second set of channels, wherein the wavelength interleaver is to route light in the first set of channels to the first output of the wavelength interleaver, wherein the wavelength interleaver is to route light in the second set of channels to the second output of the wavelength interleaver, wherein the first WDM is to demultiplex the first set of channels, wherein the second WDM is to demultiplex the second set of channels, wherein a 3 dB bandwidth for channels of the first WDM is at least 50% larger than a 3 dB bandwidth for channels of the wavelength interleaver.

Example 4 includes the subject matter of any of Examples 1-3, and wherein a plurality of light sources transmit light into one or more of the plurality of outputs of the first WDM and transmit light into one or more of the plurality of outputs of the second WDM.

Example 5 includes the subject matter of any of Examples 1-4, and wherein the first WDM comprises an arrayed waveguide grating.

Example 6 includes the subject matter of any of Examples 1-5, and wherein the first WDM comprises an echelle grating.

Example 7 includes the subject matter of any of Examples 1-6, and wherein the first switch is configured to transmit substantially all light from the input of the first switch to the first output of the first switch, wherein the second switch is configured to transmit substantially all light from the second input to the output.

Example 8 includes the subject matter of any of Examples 1-7, and further including a first wavelength division multiplexer (WDM) comprising an input and a plurality of outputs, wherein the input of the first WDM is connected to the output of the second switch; and a second WDM comprising an input and a plurality of outputs, wherein the input of the second WDM is connected to the second output of the wavelength interleaver, wherein a light source provides light to the input of the first switch at each of a plurality of channels, wherein a first part of the light corresponding to a first set of channels is routed by the wavelength interleaver to the first WDM, wherein a second part of the light corresponding to a second set of channels is routed by the wavelength interleaver to the second WDM.

Example 9 includes the subject matter of any of Examples 1-8, and wherein the first switch is configured to transmit substantially all light from the input of the first switch to the second output of the first switch, wherein the second switch is configured to transmit substantially all light from the first input to the output.

Example 10 includes the subject matter of any of Examples 1-9, and further including a wavelength division multiplexer (WDM) comprising an input and a plurality of outputs, wherein the input of the WDM is connected to the output of the second switch, wherein a light source provides light to the input of the first switch at each of a plurality of channels, wherein the first switch and the second switch route the light to the WDM, wherein the WDM separates light from each of the plurality of channels into a corresponding output of the plurality of outputs.

Example 11 includes the subject matter of any of Examples 1-10, and further including a plurality of waveguides connecting the first switch, the second switch, and the wavelength interleaver, wherein the plurality of waveguides are silicon nitride waveguides.

Example 12 includes the subject matter of any of Examples 1-11, and further including a plurality of waveguides connecting the first switch, the second switch, and the wavelength interleaver, wherein the plurality of waveguides are silicon waveguides.

Example 13 includes the subject matter of any of Examples 1-12, and further including a plurality of waveguides connecting the first switch, the second switch, and the wavelength interleaver, wherein the plurality of waveguides are silicon oxide waveguides.

Example 14 includes the subject matter of any of Examples 1-13, and wherein the wavelength interleaver comprises one or more Mach-Zehnder interferometers.

Example 15 includes the subject matter of any of Examples 1-14, and wherein the first switch is a Mach-Zehnder interferometer, wherein the second switch is a Mach-Zehnder interferometer.

Example 16 includes a system comprising the PIC die of claim 15, further comprising a controller to control a phase between a first arm of the Mach-Zehnder interferometer and a second arm of the Mach-Zehnder interferometer.

Example 17 includes a system comprising the PIC die of claim 1, further comprising a controller to control the first switch and the second switch.

Example 18 includes a photonic integrated circuit (PIC) die comprising an input waveguide; a first plurality of output waveguides; a second plurality of output waveguides; and means for demultiplexing light from the input waveguide to the first plurality of output waveguides and the second plurality of output waveguides, wherein the means for demultiplexing light can be set to a first configuration and can be set to a second configuration, wherein, in the first configuration, the means for demultiplexing light demultiplexes light in a first set of channels to the first plurality of output waveguides, wherein, in the second configuration, the means for demultiplexing light demultiplexes light in a second set of channels to the first plurality of output waveguides and the second plurality of output waveguides, wherein each channel in the first set of channels overlaps with at least two channels in the second set of channels.

Example 19 includes the subject matter of Example 18, and wherein the means for demultiplexing light comprises an arrayed waveguide grating.

Example 20 includes the subject matter of any of Examples 18 and 19, and wherein the means for demultiplexing light comprises an echelle grating.

Example 21 includes the subject matter of any of Examples 18-20, and wherein the input waveguide, the first plurality of output waveguides, and the second plurality of output waveguides are silicon nitride waveguides.

Example 22 includes the subject matter of any of Examples 18-21, and wherein the input waveguide, the first plurality of output waveguides, and the second plurality of output waveguides are silicon waveguides.

Example 23 includes the subject matter of any of Examples 18-22, and wherein the input waveguide, the first plurality of output waveguides, and the second plurality of output waveguides are silicon oxide waveguides.

Example 24 includes the subject matter of any of Examples 18-23, and wherein the means for demultiplexing light comprises one or more Mach-Zehnder interferometers.

Example 25 includes a system comprising the PIC die of claim 18, further comprising a controller to control the means for demultiplexing light.

Example 26 includes a method for using a photonic integrated circuit (PIC) die, the method comprising connecting an optical fiber to the PIC die; determining a channel spacing associated with a plurality of channels associated with the optical fiber; and configuring an adaptive demultiplexer on the PIC die based on the determined channel spacing, wherein the PIC die comprises a first switch comprising an input, a first output, and a second output; a wavelength interleaver comprising an input, a first output, and a second output, wherein the first output of the first switch is connected to the input of the wavelength interleaver; and a second switch comprising a first input, a second input, and an output, wherein the first input of the second switch is connected to the second output of the first switch, wherein the second input of the second switch is connected to the first output of the wavelength interleaver.

Example 27 includes the subject matter of Example 26, and wherein the PIC die further comprises a first wavelength division multiplexer (WDM) comprising an input and a plurality of outputs, wherein the input of the first WDM is connected to the output of the second switch; and a second WDM comprising an input and a plurality of outputs, wherein the input of the second WDM is connected to the second output of the wavelength interleaver.

The invention claimed is:

1. A photonic integrated circuit (PIC) die comprising:

a first switch comprising an input, a first output, and a second output;

a wavelength interleaver comprising an input, a first output, and a second output, wherein the first output of the first switch is connected to the input of the wavelength interleaver; and a second switch comprising a first input, a second input, and an output, wherein the first input of the second switch is connected to the second output of the first switch, wherein the second input of the second switch is connected to the first output of the wavelength interleaver.

2. The PIC die of claim 1, further comprising:

a first wavelength division multiplexer (WDM) comprising an input and a plurality of outputs, wherein the input of the first WDM is connected to the output of the second switch; and a second WDM comprising an input and a plurality of outputs, wherein the input of the second WDM is connected to the second output of the wavelength interleaver.

3. The PIC die of claim 2, wherein the wavelength interleaver is to deinterleave a first set of channels from a second set of channels, wherein the wavelength interleaver is to route light in the first set of channels to the first output of the wavelength interleaver, wherein the wavelength interleaver is to route light in the second set of channels to the second output of the wavelength interleaver, wherein the first WDM is to demultiplex the first set of channels, wherein the second WDM is to demultiplex the second set of channels, wherein a 3 dB bandwidth for channels of the first WDM is at least 50% larger than a 3 dB bandwidth for channels of the wavelength interleaver.

4. The PIC die of claim 2, wherein a plurality of light sources transmit light into one or more of the plurality of outputs of the first WDM and transmit light into one or more of the plurality of outputs of the second WDM.

5. The PIC die of claim 2, wherein the first WDM comprises an echelle grating.

6. The PIC die of claim 1, wherein the first switch is configured to transmit substantially all light from the input of the first switch to the first output of the first switch, wherein the second switch is configured to transmit substantially all light from the second input to the output.

7. The PIC die of claim 6, further comprising:

a first wavelength division multiplexer (WDM) comprising an input and a plurality of outputs, wherein the input of the first WDM is connected to the output of the second switch; and a second WDM comprising an input and a plurality of outputs, wherein the input of the second WDM is connected to the second output of the wavelength interleaver, wherein a light source provides light to the input of the first switch at each of a plurality of channels, wherein a first part of the light corresponding to a first set of channels is routed by the wavelength interleaver to the first WDM, wherein a second part of the light corresponding to a second set of channels is routed by the wavelength interleaver to the second WDM.

8. The PIC die of claim 1, wherein the first switch is configured to transmit substantially all light from the input of the first switch to the second output of the first switch, wherein the second switch is configured to transmit substantially all light from the first input to the output.

9. The PIC die of claim 8, further comprising:

a wavelength division multiplexer (WDM) comprising an input and a plurality of outputs, wherein the input of the WDM is connected to the output of the second switch, wherein a light source provides light to the input of the first switch at each of a plurality of channels, wherein the first switch and the second switch route the light to the WDM, wherein the WDM separates light from each of the plurality of channels into a corresponding output of the plurality of outputs.

10. The PIC die of claim 1, further comprising a plurality of waveguides connecting the first switch, the second switch, and the wavelength interleaver, wherein the plurality of waveguides are silicon waveguides.

11. The PIC die of claim 1, wherein the wavelength interleaver comprises one or more Mach-Zehnder interferometers.

12. The PIC die of claim 1, wherein the first switch is a Mach-Zehnder interferometer, wherein the second switch is a Mach-Zehnder interferometer.

13. A system comprising the PIC die of claim 12, further comprising a controller to control a phase between a first arm of the Mach-Zehnder interferometer of the first switch and a second arm of the Mach-Zehnder interferometer of the second switch.

14. A system comprising the PIC die of claim 1, further comprising a controller to control the first switch and the second switch.

15. A photonic integrated circuit (PIC) die comprising:
an input waveguide;
a first plurality of output waveguides;
a second plurality of output waveguides; and
means for demultiplexing light from the input waveguide to the first plurality of output waveguides and the second plurality of output waveguides,
wherein the means for demultiplexing light can be set to a first configuration and can be set to a second configuration,
wherein, in the first configuration, the means for demultiplexing light demultiplexes light in a first set of channels to the first plurality of output waveguides,
wherein, in the second configuration, the means for demultiplexing light demultiplexes light in a second set of channels to the first plurality of output waveguides and the second plurality of output waveguides,
wherein each channel in the first set of channels overlaps with at least two channels in the second set of channels.

16. The PIC die of claim 15, wherein the means for demultiplexing light comprises an echelle grating.

17. The PIC die of claim 15, wherein the input waveguide, the first plurality of output waveguides, and the second plurality of output waveguides are silicon waveguides.

18. The PIC die of claim 15, wherein the means for demultiplexing light comprises one or more Mach-Zehnder interferometers.

19. A system comprising the PIC die of claim 15, further comprising a controller to control the means for demultiplexing light.

20. The PIC die of claim 15, further comprising:
a first wavelength division multiplexer (WDM) comprising an input and a plurality of outputs, wherein the input of the first WDM is connected to receive light from the first plurality of output waveguides; and
a second WDM comprising an input and a plurality of outputs, wherein the input of the second WDM is connected to receive light from the second plurality of output waveguides,
wherein, in the second configuration, the means for demultiplexing light is to deinterleave the second set of channels into a first subset of channels and a second subset of channels, to route light in the first subset of channels to the first plurality of output waveguides, and to route light in the second subset of channels to the second plurality of output waveguides,
wherein the first WDM is to demultiplex the first subset of channels,
wherein the second WDM is to demultiplex the second subset of channels,
wherein a 3 dB bandwidth for channels of the first WDM is at least 50% larger than a 3 dB bandwidth for channels into which the means for demultiplexing light deinterleaves the second set of channels.

21. The PIC die of claim 15, further comprising:
a first wavelength division multiplexer (WDM) comprising an input and a plurality of outputs, wherein the input of the first WDM is connected to receive light from the first plurality of output waveguides; and
a second WDM comprising an input and a plurality of outputs, wherein the input of the second WDM is connected to receive light from the second plurality of output waveguides,
wherein, in the first configuration, the means for demultiplexing light is configured to transmit substantially all light received at the input waveguide to the first plurality of output waveguides without deinterleaving,
wherein a light source provides light to the input waveguide at each of a plurality of channels,
wherein, in the second configuration, a first part of the light corresponding to the first set of channels is routed by the means for demultiplexing light to the first WDM,
wherein, in the second configuration, a second part of the light corresponding to the second set of channels is routed by the means for demultiplexing light to the second WDM.

22. A method for using a photonic integrated circuit (PIC) die, the method comprising:
connecting an optical fiber to the PIC die;
determining a channel spacing associated with a plurality of channels associated with the optical fiber; and
configuring an adaptive demultiplexer on the PIC die based on the determined channel spacing,
wherein the PIC die comprises:
a first switch comprising an input, a first output, and a second output;
a wavelength interleaver comprising an input, a first output, and a second output, wherein the first output of the first switch is connected to the input of the wavelength interleaver; and
a second switch comprising a first input, a second input, and an output, wherein the first input of the second switch is connected to the second output of the first switch, wherein the second input of the second switch is connected to the first output of the wavelength interleaver.

23. The method of claim 22, wherein the PIC die further comprises:
a first wavelength division multiplexer (WDM) comprising an input and a plurality of outputs, wherein the input of the first WDM is connected to the output of the second switch; and
a second WDM comprising an input and a plurality of outputs, wherein the input of the second WDM is connected to the second output of the wavelength interleaver.

24. The method of claim 23, wherein the wavelength interleaver is to deinterleave a first set of channels from a second set of channels, wherein the wavelength interleaver is to route light in the first set of channels to the first output of the wavelength interleaver, wherein the wavelength interleaver is to route light in the second set of channels to the second output of the wavelength interleaver,
wherein the first WDM is to demultiplex the first set of channels,
wherein the second WDM is to demultiplex the second set of channels,
wherein a 3 dB bandwidth for channels of the first WDM is at least 50% larger than a 3 dB bandwidth for channels of the wavelength interleaver.

25. The method of claim 22, wherein the PIC die further comprises:
a first wavelength division multiplexer (WDM) comprising an input and a plurality of outputs, wherein the input of the first WDM is connected to the output of the second switch; and
a second WDM comprising an input and a plurality of outputs, wherein the input of the second WDM is connected to the second output of the wavelength interleaver, wherein the first switch is configured to transmit substantially all light from the input of the first switch to the first output of the first switch, wherein the second switch is configured to transmit substantially all light from the second input to the output, wherein a light source provides light to the input of the first switch at each of a plurality of channels, wherein a first part of the light corresponding to a first set of channels is routed by the wavelength interleaver to the first WDM, wherein a second part of the light corresponding to a second set of channels is routed by the wavelength interleaver to the second WDM.

* * * * *